(12) United States Patent
Beacham

(10) Patent No.: US 11,374,847 B1
(45) Date of Patent: Jun. 28, 2022

(54) SYSTEMS AND METHODS FOR SWITCH STACK EMULATION, MONITORING, AND CONTROL

(71) Applicant: C/HCA, Inc., Nashville, TN (US)

(72) Inventor: Timothy Beacham, Dawsonville, GA (US)

(73) Assignee: C/HCA, Inc., Nashville, TN (US)

(*) Notice: Subject to any disclaimer, the term of this patent is extended or adjusted under 35 U.S.C. 154(b) by 0 days.

(21) Appl. No.: 17/061,851

(22) Filed: Oct. 2, 2020

Related U.S. Application Data

(63) Continuation of application No. 16/709,248, filed on Dec. 10, 2019, now Pat. No. 10,797,987.

(60) Provisional application No. 62/777,615, filed on Dec. 10, 2018.

(51) Int. Cl.
| | |
|---|---|
| *H04L 45/02* | (2022.01) |
| *H04L 41/0816* | (2022.01) |
| *H04L 12/46* | (2006.01) |
| *H04L 41/22* | (2022.01) |
| *H04L 41/14* | (2022.01) |
| *H04L 49/25* | (2022.01) |
| *H04L 41/08* | (2022.01) |

(52) U.S. Cl.
CPC .......... *H04L 45/02* (2013.01); *H04L 12/4641* (2013.01); *H04L 41/0816* (2013.01); *H04L 41/0879* (2013.01); *H04L 41/14* (2013.01); *H04L 41/22* (2013.01); *H04L 49/25* (2013.01)

(58) Field of Classification Search
CPC ..... H04L 41/0253; H04L 41/0813–082; H04L 41/085–0886; H04L 41/22; H04L 43/04–045; H04L 45/02; H04L 49/35–358; H04L 49/52; H04L 12/4641; H04L 2012/5617
See application file for complete search history.

(56) References Cited

U.S. PATENT DOCUMENTS

| | | | |
|---|---|---|---|
| 6,223,218 B1 * | 4/2001 | Iijima | H04L 12/4641 370/254 |
| 6,934,292 B1 | 8/2005 | Ammitzboell | |
| 7,120,683 B2 | 10/2006 | Huang | |
| 7,184,441 B1 | 2/2007 | Kadambi et al. | |
| 7,697,419 B1 * | 4/2010 | Donthi | H04L 49/65 370/220 |

(Continued)

*Primary Examiner* — Brendan Y Higa
(74) *Attorney, Agent, or Firm* — Kilpatrick Townsend & Stockton, LLP

(57) ABSTRACT

Systems, methods, and machine-readable storage media to facilitate adaptive switch stack interaction are disclosed. Discovery may be performed via a network with respect to switches, each switch corresponding to a switch stack and including ports communicatively coupled to endpoint devices or access points. Switch data transmitted from the plurality of switches may be processed and used to develop models of the switches. Each model may include switch specifications, and a particular model may be used to emulate a particular switch. Emulation data may be created to facilitate a graphical representation formatted to represent the particular switch. The emulation data may be transmitted to an endpoint device to facilitate an emulation interface that may correspond to a graphical layout of the particular switch that allows access, via user-selectable interface elements, to a subset of the switch data that is mapped to the particular switch.

18 Claims, 17 Drawing Sheets

(56) References Cited

U.S. PATENT DOCUMENTS

| | | | |
|---|---|---|---|
| 9,847,911 B1* | 12/2017 | Gigandet | H04L 41/0869 |
| 10,797,987 B1* | 10/2020 | Beacham | H04L 49/25 |
| 2002/0178246 A1 | 11/2002 | Mayer | |
| 2011/0286357 A1* | 11/2011 | Haris | H04L 41/0886 |
| | | | 370/254 |
| 2014/0362709 A1* | 12/2014 | Kashyap | H04L 43/04 |
| | | | 370/250 |
| 2016/0013990 A1 | 1/2016 | Kulkarni | |
| 2016/0105316 A1* | 4/2016 | Guntaka | H04L 49/15 |
| | | | 370/254 |
| 2016/0132372 A1 | 5/2016 | Anderson | |
| 2016/0191314 A1* | 6/2016 | Russell | H04L 41/22 |
| | | | 709/221 |
| 2016/0218918 A1 | 7/2016 | Chu | |
| 2016/0254964 A1 | 9/2016 | Benc | |
| 2016/0301577 A1* | 10/2016 | Lane | H04L 12/4679 |
| 2017/0048110 A1 | 2/2017 | Wu | |
| 2017/0054758 A1 | 2/2017 | Maino | |
| 2017/0187577 A1 | 6/2017 | Nevrekar | |
| 2018/0183663 A1* | 6/2018 | Teeter | H04L 12/4641 |
| 2018/0351791 A1 | 12/2018 | Nagarajan | |
| 2018/0365121 A1 | 12/2018 | Harneja | |
| 2018/0367396 A1 | 12/2018 | Kompella | |
| 2018/0367412 A1 | 12/2018 | Sethi | |
| 2019/0081850 A1 | 3/2019 | Nazar | |
| 2020/0244533 A1* | 7/2020 | Gopalarathnam | H04L 41/0893 |

* cited by examiner

SYSTEMS AND METHODS FOR SWITCH STACK EMULATION, MONITORING, AND CONTROL

CROSS REFERENCES TO RELATED APPLICATIONS

This application is a continuation of U.S. patent application Ser. No. 16/709,248, filed Dec. 10, 2019, which claims the benefit of and priority to U.S. Provisional Application No. 62/777,615, filed Dec. 10, 2018, each of which is hereby incorporated by reference in its entirety for all purposes.

BACKGROUND

Certain embodiments of the present disclosure relate generally to control systems and, in particular but not by way of limitation, to systems and methods for switch stack emulation, monitoring, and control.

In various types of facility networks, there may be many VLANs (virtual local-area networks), for example, 80 to 100 or more VLANs on premises. The VLANs may be of various distinct types, such as voice VLANs, data VLANs, etc. Each component of a variety of various components (phones, such as VOIP phones; printers; computers, workstations, etc.; multimedia devices; access points with various levels of security such as open, secured guest networks, private networks, etc.; security cameras; servers; etc.) may belong to a VLAN. Each switch in an IDF (intermediate distribution frame) may have a respective number of ports. For example, a switch may have 48 ports. One or more of the ports of a switch may be assigned as a member of a VLAN, and different ports of a switch may be members of different VLANs. Conventional means of keeping track of the various switches, port assignments for various switches, and otherwise maintaining are laborious, error-prone, and deficient in a number of ways. Such means can be cumbersome, time-consuming, and error-prone, especially with increasing numbers of VLANs in modern networks.

Therefore, there is a need in the art for improvements that address the limitations and technical challenges that have limited conventional networks. This and others needs are addressed by the present disclosure.

BRIEF SUMMARY

Certain embodiments of the present disclosure relate generally to control systems and, in particular but not by way of limitation, to systems and methods for switch stack emulation, monitoring, and control.

In one aspect, a system to facilitate adaptive switch stack interaction is disclosed. The system may include one or more network interfaces, memory configured to store computer-executable instructions, and one or more processing devices communicatively coupled with the one or more network interfaces and the memory. The one or more processing devices may be configured to execute the computer-executable instructions to perform operations include one or a combination of the following. Discovery may be performed with respect to a plurality of switches, which are communicatively coupled with the server system. The discovery may include communicating with the plurality of switches via a network, where each switch of the plurality of switches: corresponds to a switch stack; and includes a plurality of ports, where one or more ports of the plurality of ports are communicatively coupled to one or more endpoint devices and/or one or more access points. The discovery may include receiving switch data transmitted from the plurality of switches via the network, processing the switch data and using items of the switch data to develop models of the switches, and storing the models of the switches. Each model may include switch specifications for a particular switch of the plurality of switches. A particular model of the models may be used to emulate the particular switch corresponding to the particular model. Emulation data that is based at least in part on the particular model may be created to facilitate a graphical representation, where the graphical representation is formatted to represent the particular switch. The emulation data may be transmitted to at least one endpoint device to facilitate an emulation interface that is accessible by the at least one endpoint device. The emulation interface may correspond to a graphical layout of the particular switch that allows access to at least a subset of the switch data via one or more interface elements that are user-selectable. The subset of the switch data may be mapped to the particular switch. Portions of the subset of the switch data may be mapped to one or more ports of the particular switch.

In other aspect, a method to facilitate adaptive switch stack interaction is disclosed. The method may include one or a combination of the following. Discovery may be performed by a server system with respect to a plurality of switches, which are communicatively coupled with the server system. The discovery may include communicating, by the server system, with the plurality of switches via a network. Each switch of the plurality of switches may correspond to a switch stack and may include a plurality of ports, where one or more ports of the plurality of ports are communicatively coupled to one or more endpoint devices and/or one or more access points. Switch data may be received by the server system, the switch data transmitted from the plurality of switches via the network. The switch data may be processed by the server system, and items of the switch data may be used to develop models of the switches. The models of the switches may be stored by the server system, each model including switch specifications for a particular switch of the plurality of switches. A particular model of the models may be used by the server system to emulate the particular switch corresponding to the particular model. Emulation data that is based at least in part on the particular model may be created by the server system to facilitate a graphical representation, where the graphical representation is formatted to represent the particular switch. The emulation data may be transmitted by the server system to at least one endpoint device to facilitate an emulation interface that is accessible by the at least one endpoint device. The emulation interface may correspond to a graphical layout of the particular switch that allows access to at least a subset of the switch data via one or more interface elements that are user-selectable. The subset of the switch data may be mapped to the particular switch. Portions of the subset of the switch data may be mapped to one or more ports of the particular switch.

In yet another aspect, one or more machine-readable storage devices for storing machine-executable instructions are disclosed. The machine-executable instructions, when executed by one or more processing devices, may cause the one or more processing devices to perform one or a combination of the following operations. Discovery may be performed with respect to a plurality of switches, which are communicatively coupled with the server system. The discovery may include communicating with the plurality of switches via a network. Each switch of the plurality of switches may correspond to a switch stack and may include a plurality of ports, where one or more ports of the plurality of ports are communicatively coupled to one or more endpoint devices and/or one or more access points. The discovery may include receiving switch data transmitted from the plurality of switches via the network, processing the switch data and using items of the switch data to develop models of the switches, and storing the models of the switches, each model including switch specifications for a particular switch of the plurality of switches. A particular model of the models may be used to emulate the particular switch corresponding to the particular model. Emulation data that is based at least in part on the particular model may be created to facilitate a graphical representation, where the graphical representation is formatted to represent the particular switch. The emulation data may be transmitted to at least one endpoint device to facilitate an emulation interface that is accessible by the at least one endpoint device. The emulation interface may correspond to a graphical layout of the particular switch that allows access to at least a subset of the switch data via one or more interface elements that are user-selectable. The subset of the switch data may be mapped to the particular switch. Portions of the subset of the switch data may be mapped to one or more ports of the particular switch.

In various embodiments, the emulation interface may corresponds to a port-by-port layout of the particular switch that visually represents the particular switch, including a physical layout of ports of the particular switch. In various embodiments, the one or more interface elements may include options to reveal port data corresponding to one or more of the ports of the particular switch. In various embodiments, at least one update of switch data transmitted from the particular switch may be received. Responsive to the at least one update, the model of the particular switch may be updated. Updated emulation data may be transmitted to the at least one endpoint device to cause updating of the emulation interface to indicate the at least update.

In various embodiments, the at least one update of switch data may be a real-time update that corresponds to a real-time change of at least one port of the particular switch. In various embodiments, at least one transmission may be received from the at least one endpoint device that corresponds to a selection of a particular interface element of the emulation interface, where the selection indicates a user-initiated change to a port configuration of a particular port of the particular switch. The user-initiated change may be evaluated based at least in part on one or more constraints determined for the particular port of the particular switch. Responsive to the at least one transmission, a port configuration of the port of the particular switch may be changed when the user-initiated change is determined to meet the one or more constraints, and the user-initiated change may be prohibited when the user-initiated change is determined to violate at least one constraint of the one or more constraints.

In various embodiments, the plurality of switches may be communicated with via the network, and switch configurations corresponding to at least some switches of the plurality of switches may be validated as being configured to allow remote management of the at least some switches. Configuration data may be received from at least a subset of one or more switches of the plurality of switches, and the received configuration data may be compared to a stored set of configuration specifications that specify minimum configuration requirements for switch configurations that allow the remote management of the at least the subset of one or more switches. Based at least in part on the comparing, when the subset of one or more switches is identified as not satisfying the minimum configuration requirements, one or more integration processes may be executed to configure the subset of one or more switches so that the subset of one or more switches satisfy the minimum configuration requirements.

In various embodiments, the one or more integration processes may include causing a code-level update to be performed on the subset of one or more switches. Sensor-based data that is based at least in part on a first set of one or more sensors at and/or proximate to the switch stack may be received, the first set of one or more sensors capturing phenomena at and/or proximate to the switch stack. A particularized specification of one or more recognized patterns mapped to the particular switch and/or the switch stack may be adaptively developed based at least in part on processing the sensor-based data. The particularized specification of the one or more recognized patterns may include one or more recognized patterns of sensor input.

Additional data may be received that is one or more of based at least in part on the first set of one or more sensors, based at least in part on a second set of one or more sensors at the endpoint device, and/or based at least in part on additional switch data received from the particular switch. A nonconformance of the additional data with respect to the particularized specification of the one or more recognized patterns mapped to the particular switch and/or the switch stack may be detected. Responsive to the detection of the nonconformance, one or more adaptive controls in operation of one or a combination the first set of one or more sensors, the second set of one or more sensors, and/or the particular switch may be selectively caused. Subsequent sensor-based data based at least in part on one or both of the first set of one or more sensors and the second set of one or more sensors may be collected. In various embodiments, the one or more adaptive controls may include selectively prohibiting access to the particular switch with one or more port locking operations. In various embodiments, the one or more adaptive controls may include transmitting a communication to the endpoint device and a second endpoint device to facilitate authenticated access to the sensor-based data and/or the subsequent sensor-based data.

In various embodiments, communicating with a second switch of the plurality of switches may be attempted, and a switch condition that corresponds to a non-responsive switch may be detected. The detected condition may be determined to be correctable. One or more adaptive controls may be selectively caused to correct the detected condition so that the non-responsive switch becomes responsive.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Various embodiments in accordance with the present disclosure will be described with reference to the following appended drawings.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
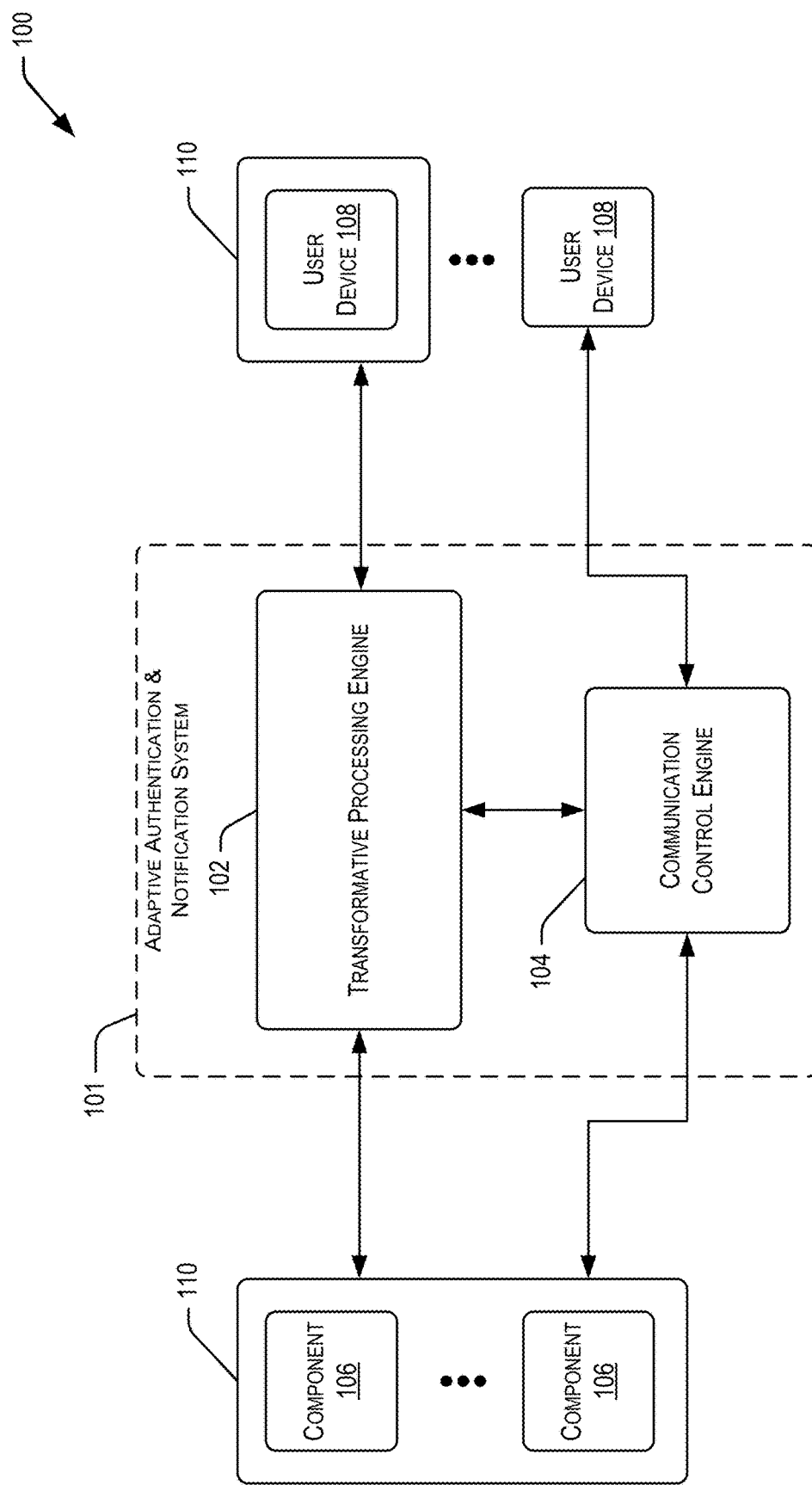
FIG. 1 is an example block diagram of a medical provider network with an adaptive switch stack interaction system, in accordance with embodiments of the present disclosure.

Referring first to FIG. 1, a block diagram of an embodiment of an interaction system 100 with an adaptive switch stack interaction system 101 is illustrated. In various embodiments, the adaptive switch stack interaction system 101 may at least partially include one or both of a transformative processing engine 102 and a communication control engine 104. Generally, in interaction system 100, data may be generated at one or more system components 106 and/or devices 108. Communication control engine 104 may control the flow of communications within interaction system. Transformative processing engine 102 may receive, intercept, track, integrate, process and/or store such data.

Data flowing in interaction system 100 may include a set of communications. Each of one, some of all communications may include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include secured information.

For example, a system component 106 may include, for example, a sensor to detect a sensor measurement and may thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier may be determined, for example, based on detection of a nearby electronic tag (e.g., RFID tag), a detected input received at a user interface of component 106 and/or data in a corresponding communication received from a user device.

As another example, a device 108 may be configured to detect input received at a user interface of the device. The input may include, for example, an identifier of an object or entity, an instruction, a characterization of an object or entity, an identification of an analysis to be performed, a specification of an aggregation or data processing to be performed, and/or an identification of a destination for a data-analysis report. User device 108 may further be configured to detect input requesting particular data, to generate a request communication (e.g., to be sent to transformative processing engine), to receive the requested data and/or to present the received data.

The depicted engines, devices and/or components may communicate over one or more networks. A network of one or more networks may include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 106 and one or more devices 108 are illustrated as communicating via transformative processing engine 102 and/or control engine 104, this specification is not so limited. For example, each of one or more components 106 may communicate with each of one or more devices 108 directly via other or the same communication networks.

A component 106 may be configured to detect, process and/or receive data, such as environmental data, geophysical data, biometric data, chemical data (e.g., chemical composition or concentration analysis data), and/or network data. The data may be based on data detected, for example, via a sensor, received signal or input. A user device 108 may include a device configured to receive data from a user and/or present data to a user. It will be appreciated that, in some instances, a component 106 is also a user device 108 and vice-versa. For example, a single device may be configured to detect sensor measurements, receive input and present output.

A component 106 may be configured to generate a communication that is in one or more formats, some of which may be proprietary. For example, an imaging machine (e.g., one of one or more components 106) manufactured by company A, located within a first premises (e.g., premises 110), and belonging to a first client, may save and transfer data in a first format. An imaging machine (e.g., one of one or more components 106) manufactured by company B, located within the first premises (e.g., premises 110), and belonging to the first client, may save and transfer data in a second format. In some examples, data from certain components is transformed, translated, or otherwise adjusted to be recognizable by transformative processing engine 102. Thus, continuing with the example from above, when the imaging machines manufactured by companies A and B are located within the first premises belonging to the first client, they may nevertheless save and transfer data in different formats. In some examples, one or more components 106 communicate using a defined format.

In some examples, each of one or more components 106 are each associated with one or more clients within a same or different interaction systems. For example, certain ones of one or more components 106 may be associated with a first client, while other ones of one or more components 106 may be associated with a second client. Additionally, each of one or more components 106 may be associated with a premises 110 (e.g., client premises). Each premises 110 may correspond to a single location and/or processing focus. Exemplary types of premises include server farm premises, web-server premises, data-storage premises, technical-support premises, telecommunication premises, and/or operation premises. For example, a first premises may include a structure at a first location at which one or more resources (e.g., computational resources, equipment resources, laboratory resources and/or human resources) are provided. Each of the one or more resources may be of a first type in a first set of types. A resource type may be identified based on, for example, a characteristic of the resource (e.g., sensor inclusion) and/or a capability of providing each of one or more services. Thus, for example, resources at a first premises may be better configured for handling a particular type of service requests compared to those in another premises. As another examples, different premises may include resources of similar or same types but may vary in terms of, for example, user accessibility, location, managing client, etc.

Transmission of data from one or more components 106 to transformative processing engine 102 may be triggered by a variety of different events. For example, the data may be transmitted periodically, upon detection of an event (e.g., completion of an analysis or end of a procedure), upon detection of an event defined by a rule (e.g., a user-defined rule), upon receiving input triggering the transmission, or upon receiving a data request from transformative processing engine 102. Each transmission may include, e.g., a single record pertaining to a single entity, object, procedure, or analysis or multiple records pertaining to multiple entities, objects, procedures, or analyses.

In some examples, at least some of one or more devices 108 are associated with premises 110. In some examples, at least some of one or more devices 108 need not be associated with premises 110 or any other premises. Similar to one or more components 106, one or more devices 108 may be capable of receiving, generating, processing and/or transmitting data. Examples of one or more devices 108 include, for example, a computer, a mobile device, a smart phone, a laptop, an electronic badge, a set-top box, a thin client device, a tablet, a pager, and other similar user devices). One or more devices 108 may be configured to run one or more applications developed for interacting with data collected by transformative processing engine 102. For example, those user devices of one or more devices 108 that are not associated with premises 110 may be configured to run one or more third-party applications that may rely in part on the data gathered by transformative processing engine 102.

Each of one or more components 106 and one or more devices 108 may be utilized by one or more users (not shown). Each of the one or more users may be associated with one or more clients. For example, one of the one or more users may be associated with a client as a result of being employed by the client, physically located at a location of the client, being an agent of the client or receiving a service from the client.

In some examples, one or more components 106 and one or more devices 108 may communicate with transformative processing engine 102 and control engine 104 via different information formats, different proprietary protocols, different encryption techniques, different languages, different machine languages, and the like. As will be discussed with reference to FIG. 2, transformative processing engine 102 is configured to receive these many different communications from one or more components 106, and in some examples from one or more devices 108, in their native formats and transform them into any of one or more formats. The received and/or transformed communications may be transmitted to one or more other devices (e.g., control engine 104, an entity device and/or a user device) and/or locally or remotely stored. In some examples, transformative processing engine 102 receives data in a particular format (e.g., the HL7 format) or conforming to any other suitable format and/or is configured to transform received data to conform with the particular format.

One or more components 106 of premises 110 may include and/or has access to a local or remote memory for storing generated data. In some examples, the data is stored by one or more servers local to premises 110. Such storage may enable premises 110 to retain locally data pertaining to its premises prior to (or in conjunction with) the data being shared with transformative processing engine 102 and/or control engine 104. In some examples, the one or more servers of premises 110 share data directly with a record service (not shown), and the record service makes the data available to transformative processing engine 102 and/or control engine 104. Once an electronic record is updated at premises 110, an indication of the update may be provide to the record service. The record service may then update a corresponding record associated with the electronic record.

The record service may be granted access to the data generated and/or transmitted by one or more components 106. In some examples, the record service may include a server or a plurality of servers arranged in a cluster or the like. These server(s) of the record service may process and/or store data generated by one or more components 106. For example, one or more records may be generated for each entity (e.g., each record corresponding to a different entity or being shared across entities). Upon receiving a communication with data from an component (or premises), the record service may identify a corresponding record and update the record to include the data (or processed version thereof). In some examples, the record service provides data to transformative processing engine 102. Premises 110 may include one at which a resource is located and/or service is provided. Irrespective of the type of premises, premises 110 may update data, maintain data, and communicate data to transformative processing engine 102. At least some of the data may be stored local to premises 110.

A user interacting with a user device 108 may include, for example, a client customer, client agent and/or a third party. A user may interact with user device 108 and/or component 106 so as to, for example, facilitate or initiate data collection (e.g., by a component 106), provide data, initiate transmission of a data request, access data and/or initiate transmission of a data-processing or data-storage instruction. In some instances, one or more devices 108 may operate according to a private and/or proprietary network or protocols. In other examples, one or more devices 108 may operate on public networks. In any case, however, transformative processing engine 102 may have access to the one or more components and may communicate with them via a public, private and/or proprietary network or protocols. The use of one or more private and/or proprietary protocols may promote secure transfer of data.

Figure 2:
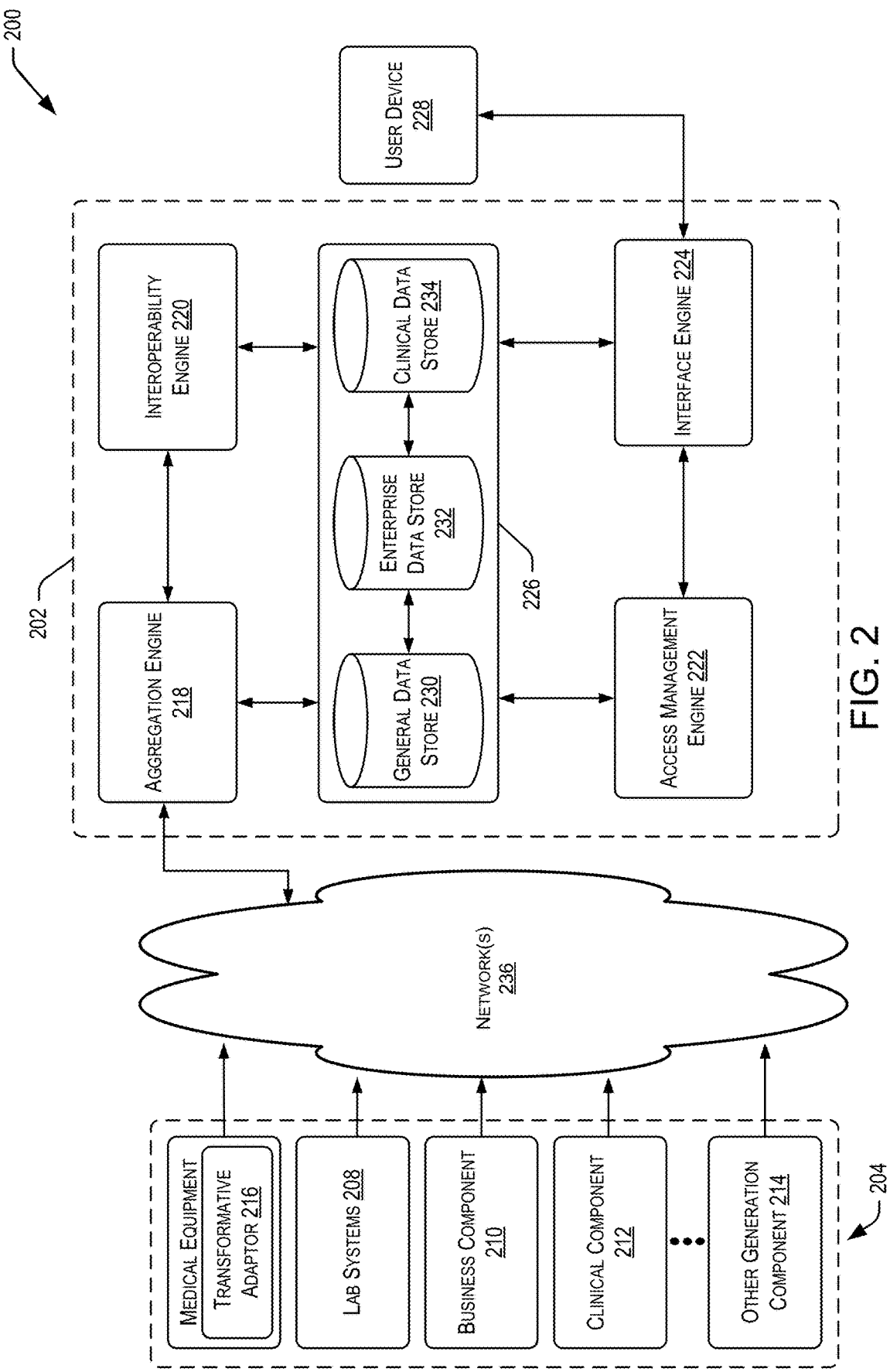
FIG. 2 is an example block diagram of certain aspects of the medical provider network, in accordance with embodiments of the present disclosure.

Referring next to FIG. 2, a block diagram of an example of an interaction system 200 is shown. Interaction system 200 may include a transformative integration engine 202. Transformative integration engine 202 is an example of transformative processing engine 102 discussed with reference to FIG. 1. Interaction system 200 also may include one or more generation components 204. In particular, one or more generation components 204 may include an equipment component 206, a lab systems component 208, a specification component 210 and other generation component 212. One or more generation components 204 are examples of one or more components 106 discussed with reference to other figures herein.

Generally, one or more generation components 204 may include any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

The one or more generation components 204 may correspond to one or more internet of things (IOT) devices. Such devices may be running software, e.g., developed in Linux, in some instances, and may be configured to send http calls via the API to send messages any time a trigger event is detected. By way of example, every time a particular door is opened, a sensor (e.g., a proximity sensor, a reed switch, a motion detector, etc.) may sense the open condition, and the corresponding IOT device may send an http call with a JSON payload with values indicative of the sensed condition, location, and time to the API to send a message to security.

As discussed in further detail herein, data generated by one or more generation components 204 may be of a variety of formats, some of which may be proprietary. For example, a single component may generate data in multiple formats, different components may generate data in different formats, and/or different component types may result in generation of data in different formats. In some instances, formatting of a data may depend on a service having been provided, a user initiating data generation, a destination to receive the data, a location at which a service was provided, etc. In some examples, a typical interaction system may include thousands of generation components producing data in hundreds of formats. In order to harness the power that comes from such a large amount of data to make informed decisions, it is desirable that all, or at least a large portion of the data, is shared. Use of transformative integration engine 202 in accordance with techniques described herein may achieve this design—making large amounts of data, in many different originating formats available to various types of users, via one or more interfaces.

While one or more generation components 204 are illustrated adjacent to each other, it is understood that each may be located within one premises or that the components may be spread out among many premises. In addition, in some examples, one or more generation components 204 belong to different clients. In some embodiments, the one or more generation components 204 may communicate with the transformative processing engine 202 via a specified protocol and the payload data of the communications may be in a variety of formats. In some embodiments, the one or more generation components 204 may communicate with the transformative processing engine 202 via a specified protocol the payload data of the communications may be in a specified format, after the payload data was transformed to the specified format, e.g., with one or more transformative adaptors disclosed herein.

Turning now to equipment component 206, this component may include any machine, contrivance, implant, or other similar related article, that is intended to aid in reaching a particular objective. In some instances, equipment component 206 may include one or more sensors to detect environmental or other stimuli. Equipment component 206 may include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 may include transformative adaptor 216. In some examples, transformative adaptor 216 is a device that transforms, translates, converts, or otherwise adjusts output data from equipment component 206. For example, an equipment component 206 may be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative integration engine 202 may perform similar processes as it relates to all data generated within interaction system 200. In this manner, transformative adaptor 216 may perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. The one or more generation components 204 may communicate with the transformative processing engine 202 via a specified protocol, where the payload data of the communications may be in a specified format, after the payload data was transformed to the specified format, e.g., with one or more transformative adaptors 216.

Lab systems component 208 may include any suitable laboratory equipment or system that is intended to analyze material, such as biological material. This may include, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative integration engine 202.

Specification component 210 may include any suitable computing devices used for operations-related purposes with respect to interaction system 200. For example, specification component 210 may be configured to schedule a resource for allocation for a particular entity during a particular time slot. Specification component 210 may monitor a schedule for the resource and may identify one or more available time slots that may be secured by a particular entity. Upon receiving a specification indication, specification component 210 may update a schedule of a resource to reflect that a particular time slot is to be allocated for service of a particular entity. In some embodiments, the transformative processing engine 202 may be configured to monitor data (e.g., messages) that is passed over the one or more networks 236 and, from the monitored data, select certain portions to provide to one or more authorized entities.

Each of the one or more generation components 204, as well as the one or more user devices 228 corresponding to the one or more devices 108, may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and may include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors may be implemented as one or more integrated circuits, e.g., one or more single-core or multi-core microprocessors or microcontrollers, examples of which are known in the art. In operation, the one or more processors may control the operation of the particular component. The one or more processors may access and execute the program code and at any given time.

The user interface may include any combination of input and output devices. In some instances, a user may operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative integration engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative integration engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative integration engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

The transformative processing engine 202 may include an aggregation engine 218, an interoperability engine 220, an access management engine 222, an interface engine 224, and a data store 226. The interface engine 224 may be configured to retrieve the data from the data store 226 and provide one or more interfaces for interacting with elements of the transformative processing engine 202. For example, the interface engine 224 may include an interface by which an application running on user device 228 may access portions of data within the data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 may identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 may be configured to provide data from one or more communications to interoperability engine 220. Interoperability engine 220 may be configured to perform one or more operations on the received data and store it in data store 226. For example, interoperability engine 220 may perform semantic tagging and indexing of data. This may include extracting field values from data, categorizing data (e.g., by type of data, characteristic of an entity, location of premises, characteristic of premises, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which may include devices of different entities and/or a cloud server). In some examples, data store 226 may include a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, operational and analytics information, output data from one or more generation components 204, and the like may be retained. The data within the data stores 230, 232, and 234 include elements or tags such that a particular data (e.g., for a single entity, protocol, etc.) may be retrieved.

Access control engine 222 is configured to control access to features of transformative integration engine 202, including access to the data retained in data store 226. For example, access control engine 222 may verify that a user device such as user device 228 is authorized to access data store 226. To verify the user device 228, access control engine 222 may require that a user of the user device 228 input a username and password, have a profile associated with the interaction system, have paid a subscription fee associated with access to data store 226, and the like. Access control engine 222 may also verify that the user device 228 has an IP address or geographical location that corresponds to an authorized list, that the user device 228 may include a plug-in for properly accessing data store 226, that the user device 228 is running certain applications required to access data store 226, and the like.

Figure 3:
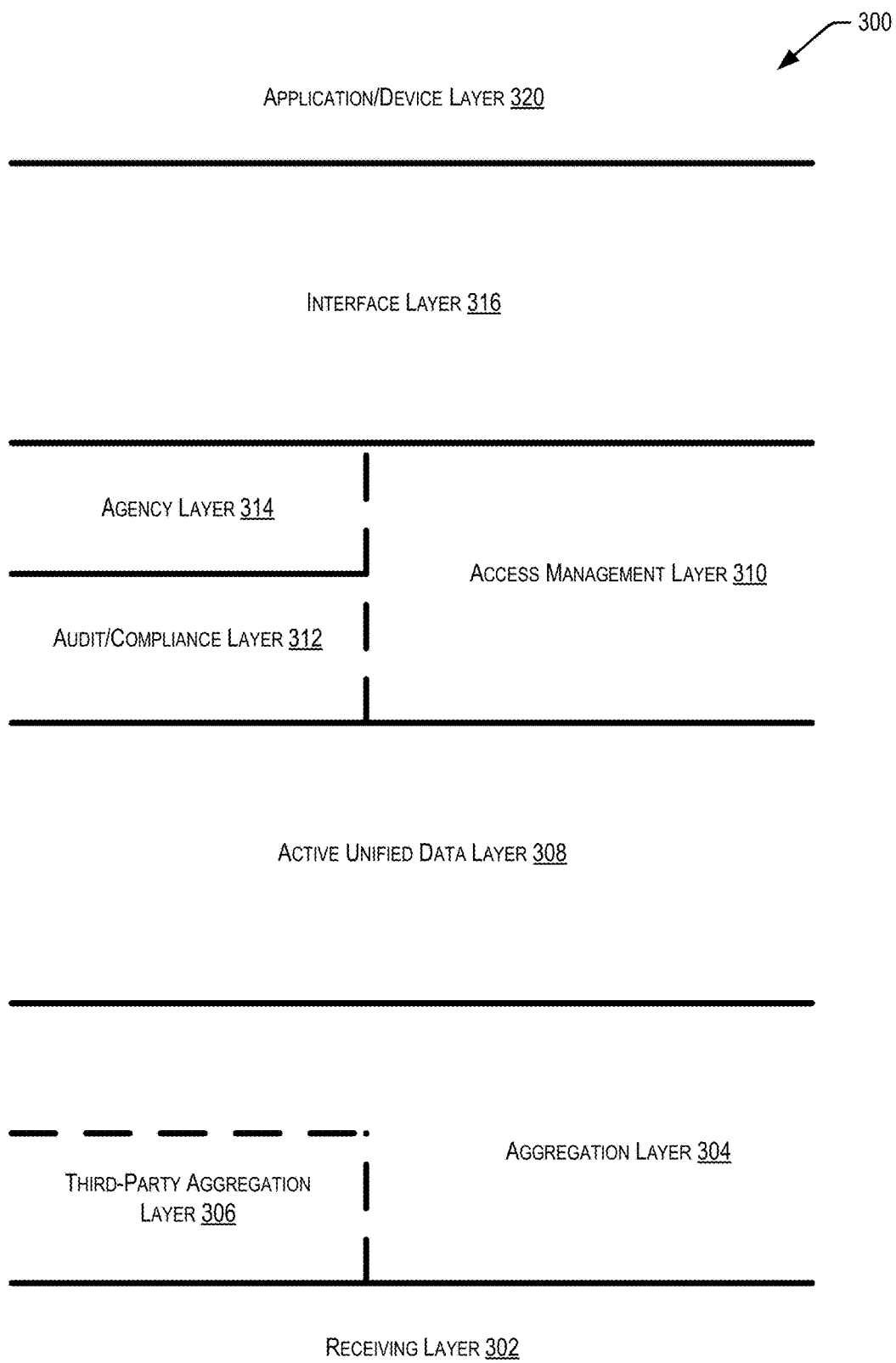
FIG. 3 illustrates a block diagram of an architecture stack, in accordance with embodiments of the present disclosure.

Turning next to FIG. 3, an architecture stack 300 is shown. In some examples, techniques relating to control of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 may be used to integrate different systems of different entities and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 may include a receiving layer 302 as the bottom-most layer. Receiving layer 302 may include receiving data from elements that share data with other elements within an aggregation layer 304. For example, as detailed herein, receiving layer 302 may include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a premises, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 may include an active unified data layer 308. Elements of active unified data layer 308 receive data from the elements of the other layers and store such data in a unified manner. In some examples, this may include storing the data in a manner that allows for searching and retrieval using a defined set of method calls, techniques, and or procedures. For example, the data may be stored such that a different application may access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also may include an access control layer 310, which may include an audit/compliance layer 312 and/or an agency layer 314. Access control layer 310 may include elements to control access to the data. For example, access control layer 310 may include elements to verify user login credentials, IP addresses associated with a user device, and the like prior to granting the user access to data stored within active unified data layer 308. Audit/compliance layer 312 may include elements to audit other elements of architecture stack 300 and ensure compliance with operating procedures. For example, this may include tracking and monitoring the other elements of access control layer 310.

Agency layer 314 may include an access location (e.g., a virtual private network, a data feed, or the like) for elements of agencies that are interested in the operations of the interaction system in which architecture stack 300 is implemented. For example, agency layer 314 may allow an entity access to some elements within architecture stack 300. This may be achieved by providing the entity a direct conduit (perhaps by a virtual private network) to the elements of access control layer 310 and the data within active unified data layer 308. Audit/compliance layer 312 and agency layer 314 are sub-layers of access control layer 310.

Architecture stack 300 also may include interface layer 316. Interface layer 316 provides interfaces for users to interact with the other elements of architecture stack 300. For example, clients, entities, administrators, and others belonging to the interaction system may utilize one or more user devices (interacting within application/device layer 320) to for sending and receiving communications via the active unified data layer 308. In some examples, the users may be unrelated to the interaction system and may use applications (not shown) to send and receive communications via one or more interfaces (e.g., to access data stored within active unified data layer 308).

Further, the architecture stack 300 may include application/device layer 320. The application/device layer 320 may include user devices and applications for sending and receiving communications via the elements of the interface layer 316. For example, the applications may be web-based applications, portals, mobile applications, widgets, and the like for sending and receiving communications (e.g., messages). These applications may run on one or more user devices. The user devices may be any suitable user device as detailed herein.

Figure 4:
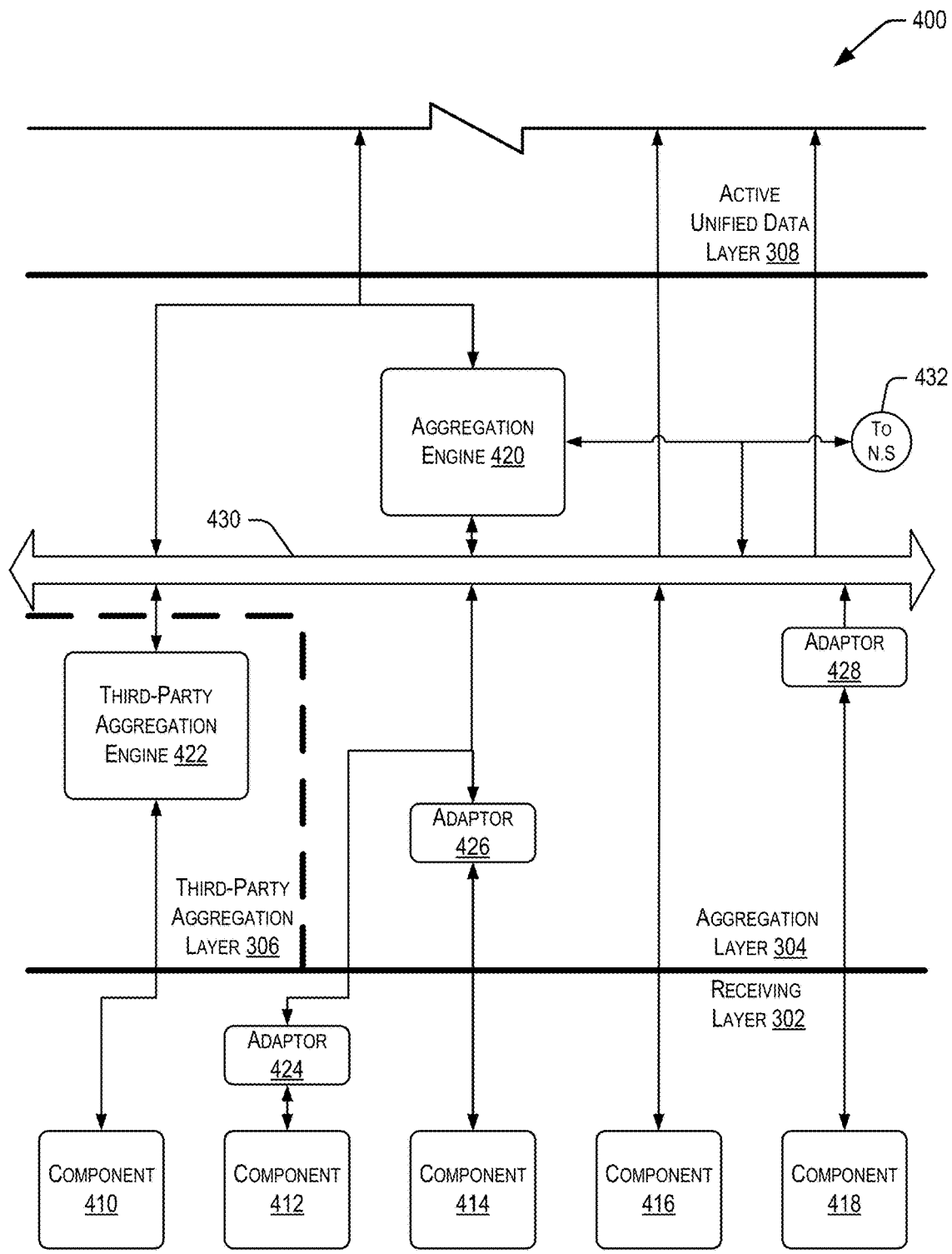
FIG. 4 illustrates a block diagram of a portion of the architecture stack, in accordance with embodiments of the present disclosure.

Turning next to FIG. 4, a diagram 400 is shown that depicts a portion of architecture stack 300 according to an embodiment of the present disclosure. In particular, the diagram 400 may include receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple premises. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data may then be transformed, translated, or otherwise adjusted before an aggregation engine 420 (e.g., aggregation engine 218) or an aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors may function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to aggregation engine 422.

In some examples, data provided by the components 410-418 may be communicated via a messaging bus 430 (e.g., the one or more networks 236). The data, in the form of messages may be put on the one or more networks 236 by the one or more components, by the aggregation engine 420, by the engine 422, and by any other suitable device capable of generating messages. In some examples, messages are taken off of the messaging bus 430 by the aggregation engine and/or by one or more listeners described in more detail herein. Thus, circle 432 indicates that data (e.g., messages) may flow from the messaging bus 430 to a notification service and processed in accordance with techniques described herein.

Aggregation engine 420 and aggregation engine 422 function in a similar manner. In some examples, aggregation engine 422 is operated by a different entity than the entity that operates aggregation engine 420. This may be because the data collected by aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the aggregation engine 422, and some of components 410-418 and elements of active unified data layer 308.

Figure 5:
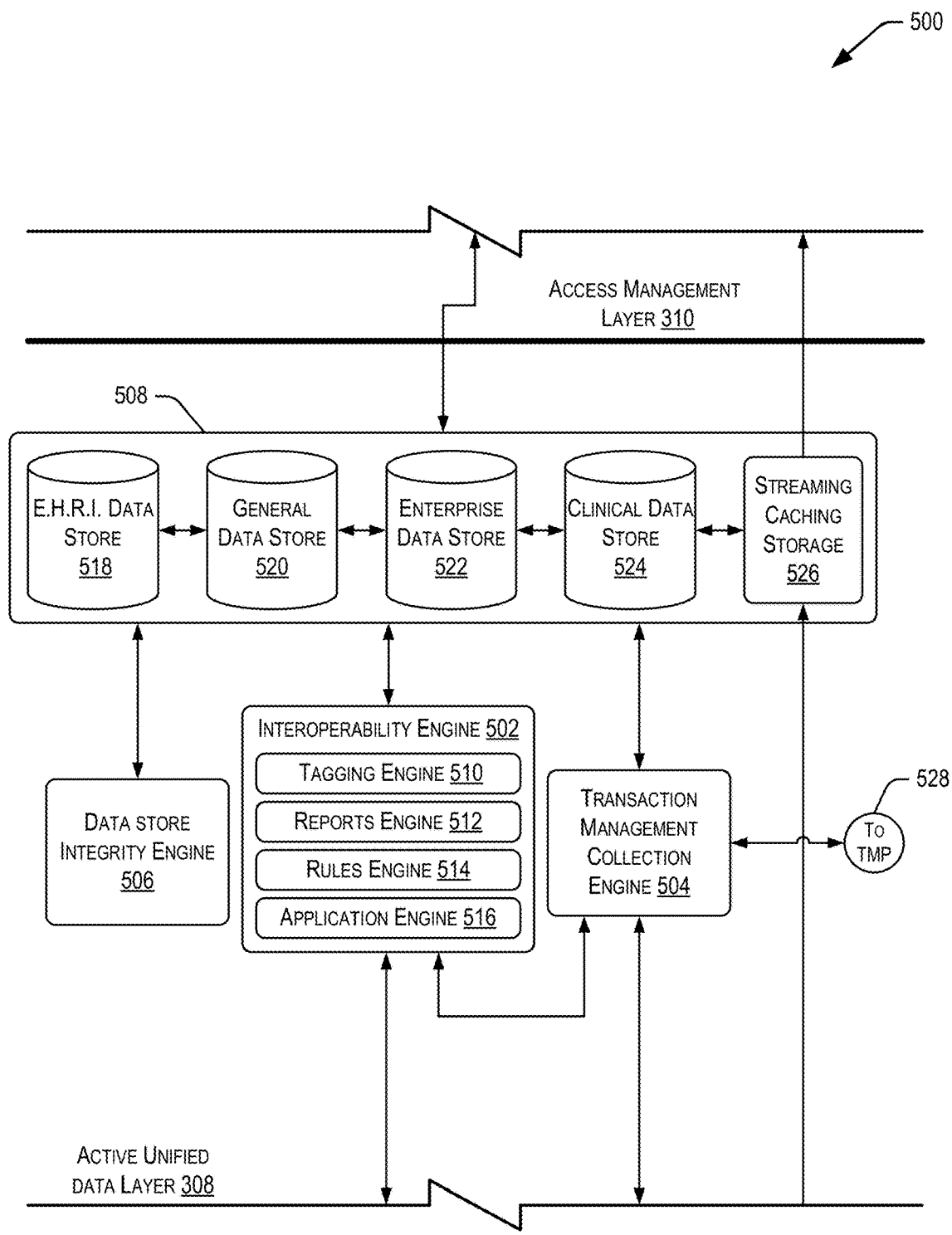
FIG. 5 illustrates a block diagram of a portion of the architecture stack, in accordance with embodiments of the present disclosure.

Referring next to FIG. 5, a diagram 500 is shown that depicts a portion of architecture stack 300 according to an embodiment of the present disclosure. In particular, diagram 500 may include active unified data layer 308 and a portion of access control layer 310. Active unified data layer 308, as illustrated in diagram 500, may include an interoperability engine 502 (e.g., interoperability engine 220), a interaction control collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Interaction control collection engine 504 is implemented as part of control engine 104. Interaction control collection engine 504 is configured to generate message indicators identifying flows of data by and between elements of an interaction system implemented using the techniques described herein. The flows of information include messages which include data, and the message indicators include unique message identifiers that may be used to identify the messages. The unique message identifiers include information that may be used to uniquely identify the messages. For example, a unique message identifier for a particular message may include a concatenation of the following information stored in a table: a source application, a premises, a message type, and a message control identification (ID). The unique message identifier may also be the message control ID. The unique message identifier may be created as messages including data are transmitted from aggregation layer 304. The table may be stored in association with the interaction control platform 528.

In some examples, the table also may include information for tracking the progress of the message from an origination node to a destination node. For example, typically when a message (e.g., any communication of data) is first received by transformative processing engine 102 (e.g., interoperability engine 502), control engine 104 (e.g., interaction control collection engine 504 of control engine 104) may generate a unique identifier for the message in order to track that message as it moves throughout the interaction system. The unique identifier may be included in the header of the message such that when the next node (e.g., component, device, server, etc.) after transformative processing engine 102 receives the message, that node may report back to control engine 104 that it saw the message. In this manner, control engine 104 may enable end-to-end tracking of messages for the life of the message.

In one example, the messages are requests. The requests may be generated based om input at one of the components. The requests may be received by transformative processing engine 102 and integrated into the system. In some examples, control engine 104 may be notified that the requests have been received and may therefore be configured to generate message IDs for each request. These message IDs may then be associated with each of the requests. As the requests continue to move throughout the interaction system (e.g., away from transformative processing engine 102), control engine 104 may be track their movement using the message IDs. If one of the requests does not make it to its destination, control engine 104 (or part of the interaction control platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, control engine 104 (e.g., interaction control collection engine 504 of control engine 104) may receive the message and/or message identifier directly from one of components 410-418. For example, one of components 410-416 may be configured to generate the unique message identifier and/or communicate directly with control engine 104. The message also may travel via one or more intermediate nodes on its way to the destination node. In some examples, a node is a component such as components 410-418, which may be running an application. In some examples, the unique identifier and the routing of the message to its destination may be stored in a table that also may include: a geolocation of each node, a network from which the message originated, a type of node, the unique node identifier, and a time associated with the message leaving the origination node. In some examples, interaction control collection engine 504 provides unique message identifiers to other elements of the interaction system to monitor the messages as they move throughout the interaction system. Interaction control collection engine 504 also provides a portion of the unique message identifiers to an interaction control platform (indicated by a circle 528) for further analysis of the message identifiers. Such analysis may include reconciliation of lost messages, latency reporting, audit control and compliance, and other such analyses. As mentioned previously, the interoperability engine 502 may be configured to store data in the data store 508. A plurality of sub-engines 510-516 of the interoperability engine 502 may be configured to perform operations relating to storing data in the data store 508.

Interoperability engine 502 may include a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by eternal mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against. Other examples, of metadata that may be included in one or more fields include author, document type, creation time, last update time, upload time and data, geographic location, unique ID associated with the client or premises where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may include filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words. In this manner, tagging engine 510 may also index portions of the data within one or more data stores of data store 508. In some examples, such indexing may be based in part on the selected tags.

Interoperability engine 502 also may include a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications may include, for example, signals, sirens, electronic notifications, popups, emails, text messages, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also may include a rules engine 514 configured to create and control operational rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 may include an application engine 516 configured to provide service-oriented architecture web services.

Data store 508 may include an electronic/digital record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 may include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data may then be formatted, filtered, sorted and/or processed and then stored, presented and/or otherwise used. In this manner, the script may be used to produce streaming analytics.

In some instances, the data query script, when executed, identifies each of the data stores of interest. Identifying the data stores of interest may include identifying at least a portion of data from the data stores simultaneously and/or sequentially. For example, the script may identify corresponding data stores (e.g., or components of a single data store or multiple data stores) that pertain to one or more similar variables but that differ in one or more other variables. Once the portion of the data from the data stores is identified, a representation of the identified data may be output to one or more files (e.g., Extensible Markup Language (XML) files) and/or in one or more formats. Such outputs may then be used to access the data within one or more relational database accessible using Structured Query Language (SQL). Queries made using SQL may be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, may include individually identifiable information. But it may also include de-identified information.

Within general data store 520 is retained data. The data may be stored in a relational database format or in any other suitable format. Thus, the data within general data store 520 may be retained in a data structure that may include one or more tables capable of accessing each other. In some examples, general data store 520 may include a subset of the information that is included in operational data store 522.

Within operational data store 522 is retained data in a relational database format. Thus, the data within operational data store 522 may be retained in a data structure that may include one or more data structures (e.g., tables) capable of accessing each other. Operational data store 522 is an example of an operational data warehouse. In operational data store 522 is joined many different types of data. In some examples, the operational data ware house 522 may include data pertaining to decision making as discussed herein and other data typically used by conventional operational concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, interactional, secure, database server with built-in search and a full suite of application services. An example of such a unified system may be Marklogic. Entity-based data store 524 may support data aggregation, data structuring, data indexing, data tagging and mapping to semantic standards, concept matching, concept extraction, machine learning algorithms, concept discovery, concept mining, and transformation of record information. In some examples, entity-based data store 524 may include data pertaining to decision making (similar to general data store 520) as discussed that is organized and accessed in a different manner. For example, the data within entity-based data store 524 may be optimized for providing and receiving information over one or more information exchanges. In some examples, entity-based data store 524 may include a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data may be cached. For example, assume that component 418 is a piece of equipment operating at Location A and that a user using a computer in Location B desires to view a live of substantially live stream of outputs of the piece of equipment. Component 418 may send a portion of data to streaming caching storage 526 which may retain the portion of the data for a certain period of time (e.g., 1 day). Thus, streaming caching storage 526 is configured to cache data that may be streamed.

Diagram 500 also may include data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
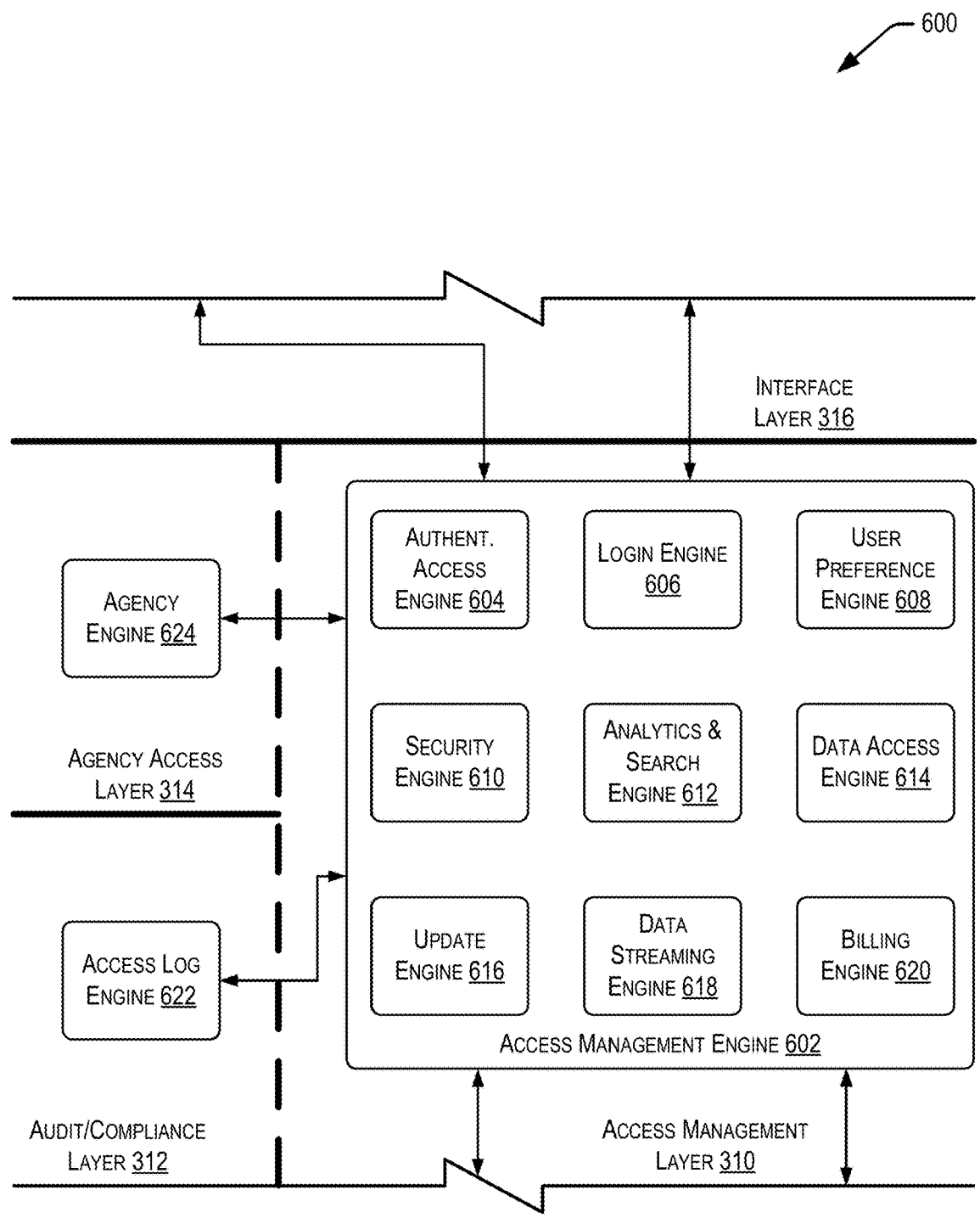
FIG. 6 illustrates a block diagram of a portion of the architecture stack, in accordance with embodiments of the present disclosure.

FIG. 6 shows a diagram 600 which depicts a portion of architecture stack 300 according to an embodiment of the present disclosure. In particular, the diagram 600 may include access control layer 310, audit/compliance layer 312, agency layer 314, and a portion of interface layer 316. Access control layer 310, as illustrated in the diagram 600, may include an access control engine 602. Access control engine 602 is an example of access control engine 222. Generally, access control engine 602 may be configured to control access to elements of transformative integration engine 202 by different components, applications, and user devices.

Access control engine 602 within access control layer 310 may also provide functionality similar to an operating system. For example, access control engine 602 may include a plurality of engines configured to control different aspects of interacting with elements of the interaction system. For example, a user who desires to access portions of data retained in data store 508, may do so by interacting with access control engine 602 using one or more applications (not shown). Thus, access control engine 602 may include a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access control engine 602 may define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 may confirm that an entered username (e.g., and password), provided biometric data or code or identifier in a scanned tag or badge matches that in an authorized user data structure.

Login engine 606 evaluates one or more user profiles associated with each authenticated user. In some examples, a user profile may include a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Analytics and search engine 612 evaluates the rules and conditions under which users may search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 may be used to search within various fields and potential field values. In some examples, search engine 612 may provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may control which users may access parts of the interaction system, data access engine 614 may control how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access control engine 602) may be provided to developers in the form of a software development kit (SDK). SDKs may enable developers write applications that may effectively communicate with elements (e.g., data store 508) of the interaction system. In particular, applications that may access a portion of the data stored within active unified data layer 308.

Update engine 616 evaluates the rules and conditions for providing updates to other engines within access control engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access may include, in some examples, logging data conventionally collected by access log engines running in similar environments. Access log engine 622 may use this data to generate and transmit reports, for example, to stakeholders of the interaction system such that they may make informed decisions regarding that is accessing the interaction system and for what purposes.

Within agency layer 314 is located an agency engine 624. Agency engine 624 evaluates the rules and conditions under which agencies may access the interaction system. For example, agencies that may use agency engine 624 include agencies to which the interaction system provides compliance, tracking, or other reporting information. For example, agency engine 624 may be used to track one or more performance indicators identified by an agency and/or to provide report instances of defined types of events. Thus, in some examples, an agency uses agency engine 624 to collect data pertaining to compliance of the interaction system with one or more statutes or regulations. In some examples, a university is an agency that uses agency engine 624 to collect data pertaining to one or more studies. In some examples, agency engine 624 may identify one or more entities (e.g., agencies) that are to receive reports pertaining to operations or events and what types of data are to be reported to those entities. Agency engine 624 may then collect the pertinent data, potentially format and/or analyze the data, and facilitate transmission of (e.g., raw, formatted and/or analysis of) the data to the appropriate agency.

Figure 7:
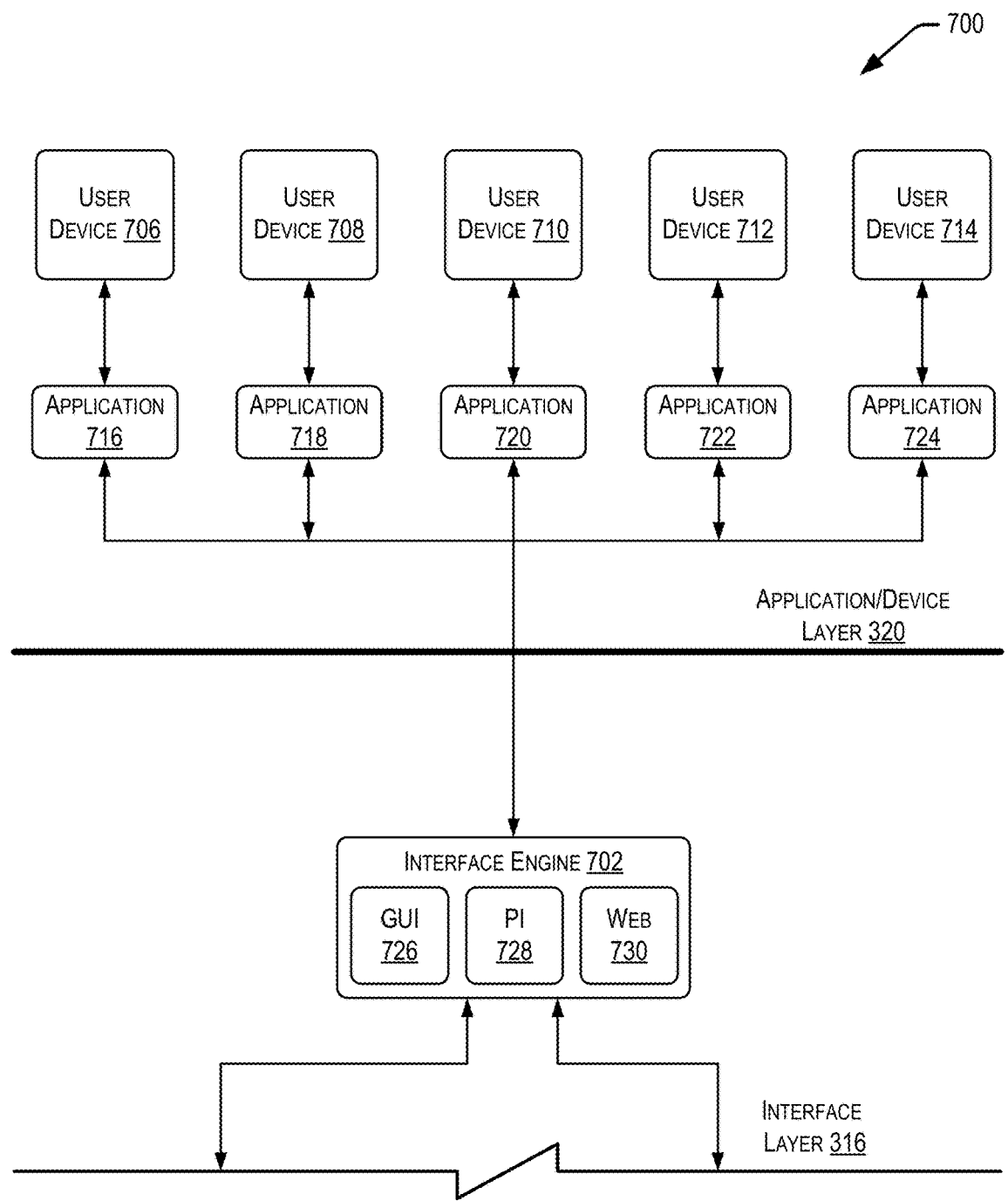
FIG. 7 illustrates a block diagram of a portion of the architecture stack, in accordance with embodiments of the present disclosure.

FIG. 7 shows a diagram 700 which depicts a portion of architecture stack 300 according to an embodiment of the present disclosure. In particular, diagram 700 may include interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access control layer 310 may be embodied.

Graphical user interface 726 is any suitable graphical user interface configured to interact with elements of the interaction system. Programmatic interface 728 may include an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive input, present dynamic presentations that depend on input, and otherwise respond to input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This may include detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that may be designed for particular users and/or uses. In one example, application 720 may include dashboards, widgets, windows, icons, and the like that are customized for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, move more relevant content to the foreground, move less relevant content to the background, populate forms for the entity.

In another example, application 722 may be specific for resources or types of resources. In this example, application 722 may include dashboards, widgets, windows, icons, and the like that are customized to individual resources. Similar to the example discussed above, in some examples, application 724 may present different data depending on a position of the resource. In this manner, application 722 adapts and automatically adjusts depending on the context in which the application is being used. For example, the resource may receive data, such as test results. In some examples, the application 722 (or any other application) may be configured to operate on a mobile device.

In some examples, application 724 may be a multi-role application for administrators and is used to control entities constitute the population of the entities within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 may provide different data depending on the role of the user. For example, whether data presented may include identifiable or de-identified information may depend on a position of the user.

In some examples, application 724 may be an operational intelligence application. In this example, application 724 is used to display operational information generated by components of the interaction system. This operational information may be used for operations, programming, and forecasting. Such operational information may include data because such data may impact operations, programming, forecasting, and the like. Accordingly, application 724 may present de-identified information in the form of one or more metrics, indicators, or the like as they pertain to operational intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
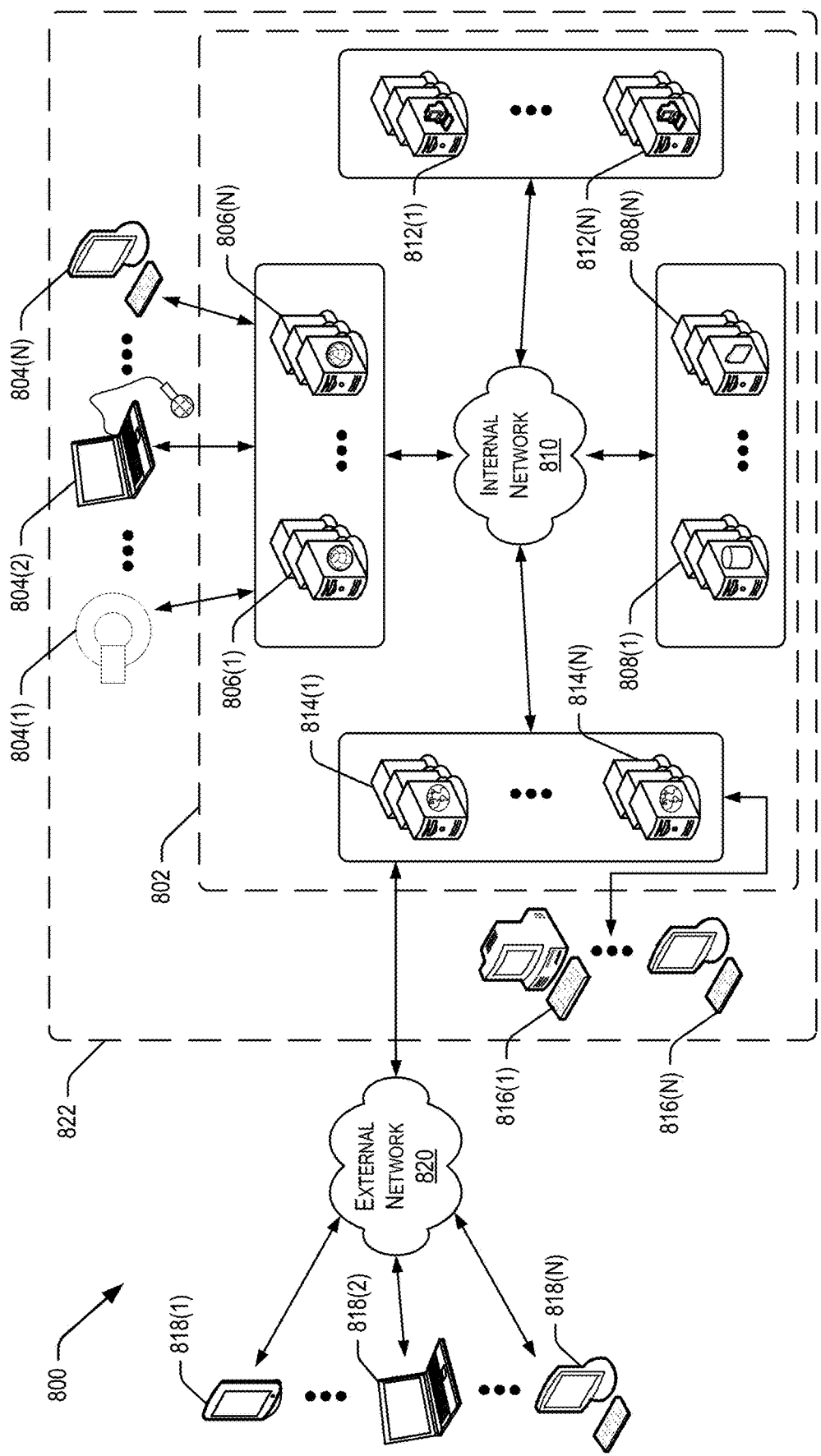
FIG. 8 illustrates a block diagram of an medical provider network, in accordance with embodiments of the present disclosure.

Turning now to FIG. 8, an interaction system 800 is shown in accordance with an embodiment of the present disclosure. Interaction system 800 may include an internal system 822 including a transformative integration engine 802. The transformative integration engine 802 is an example of transformative integration engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal system 822 may include generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810 that may correspond at least in part to the one or more network that may correspond at least in part to the one or more networks 120. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access control servers 812(1)-812(N) control access to the data retained in the data storage servers 808(1)-808(N). Access control servers 812(1)-812(N) communicate with the other elements of interaction system 800 via internal network 810 and in accordance with access control layer 310. Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) may be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) may run applications developed by third parties that access the other elements of interaction system 800 via the interfaces generated by interface servers 814(1)-814(N).

External user devices 818(1), 818(2), and 818(N) access the interfaces via external network 820 that may correspond at least in part to the one or more networks 120. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

Figure 9:
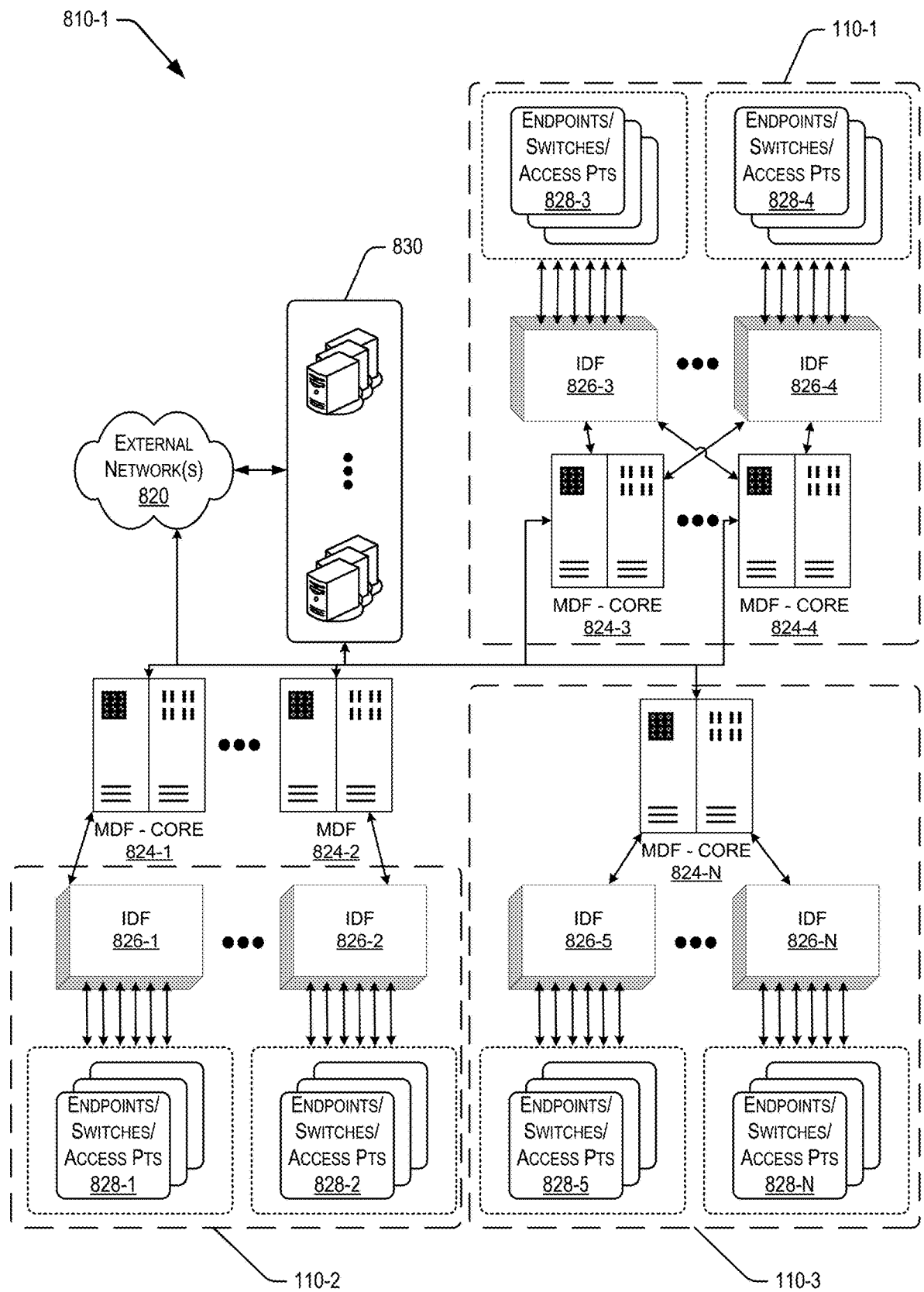
FIG. 9 illustrates a block diagram of an internal network, in accordance with embodiments of the present disclosure.

Turning now to FIG. 9, one example internal network 810-1 is shown in accordance with embodiments of the present disclosure. The internal organization 822 may include multiple segments 110. Each segment 110 may correspond to a facility. Some internal organizations 822 may include only one facility, while other international organizations 822 may include a plurality of facilities. The depicted instance shows three facilities 110. Other embodiments may include any different number of facilities. In one instance, each of the facilities 110 may correspond to or includes one or more buildings (e.g., hospitals). In another instance, the facilities 110 may correspond to subsections of a building (e.g., a hospital complex). Each facility 110 may include one or more units. Each unit may correspond to a particular space (e.g., as defined by geographic coordinates, altitude, a floor, a room number, etc.). Units within a given facility may be geographically separated from each other, such as being within or being different floors. Thus, for example, a unit may be a floor in a building.

The internal network 810 may interface with the one or more external networks 820, which may correspond to one or more wide area networks, one or more metro area networks, and/or the like. In some embodiments, the internal network 810 may interface with the one or more external networks 820 by way of one or more sets of transceiving equipment (not shown), which could be in multiple locations and may or may not be colocated with one or more of the facilities of the internal organization 822. The one or more sets of transceiving equipment may include one or a combination of one or more routers, one or more switches, one or more gateways, one or more servers, one or more firewalls, and/or the like. In some embodiments, one or more main distribution frames ("MDFs") 824 may include the one or more sets of transceiving equipment.

A server system 830 may interface with the external network 820 and various components of the internal network 810. The server system 830 may run any suitable operating system and may also run any of a variety of additional server applications and/or mid-tier applications, such that server system 830 may include one or a combination of web servers, application servers, HTTP (hypertext transport protocol) servers, Internet Information Services servers, FTP (file transfer protocol) servers, messaging gateways, CGI (common gateway interface) servers, email gateways, JAVA® servers, database servers, telephony gateways, and/or the like. Exemplary database servers include without limitation those commercially available from Oracle, Microsoft, Sybase, IBM (International Business Machines), and/or the like.

The transceiving equipment and/or the server system 830 may be at least partially located in one or more of the one or more facilities 110 or may be located remotely from the one or more facilities 110. The transceiving equipment and/or the server system 830 may be connected to a plurality of distribution components of the one or more facilities 110. For example, the transceiving equipment and/or the server system 830 may be connected to one or a combination of main distribution frames ("MDFs") 824, intermediate distribution frames ("IDFs") 826, endpoint devices, switches, and/or access points 828, and/or the like. The one or more MDFs 824 may each correspond to distribution frames with racks, switches, patch panels, wires, cables, etc. for connecting telecommunications and data lines from external network carriers to internal endpoint devices, switches, and/or access points 828 within the one or more facilities 110 directly and/or indirectly via one or more IDFs 826 with switches and similar interconnections equipment that interconnect and distribute the wiring between the MDFs 824 and the endpoint devices, switches, and/or access points 828. As illustrated, in various instances, one or more MDFs 824 and IDFs 826 may be located in a facility 110 and/or may be located externally to a facility 110. In various embodiments, one or more MDFs 824 may be connected to the one or more external networks 820 directly and/or indirectly via the server system 830.

The one or more networks of various embodiments disclosed herein, including network 810, may be separated into segments for large entities because too many Internet Protocol ("IP") addresses can present disadvantages. Such disadvantages may include difficulties ensuring standards compliance, ensuring security, ensuring quality of service, mitigating virus spread, maintaining desired LAN speeds, avoiding conflicts with expansions, and/or the like, among other disadvantages. Hence, each network of the one or more networks may be comprised of smaller networks, such as virtual LANs ("VLANs").

Figure 10:
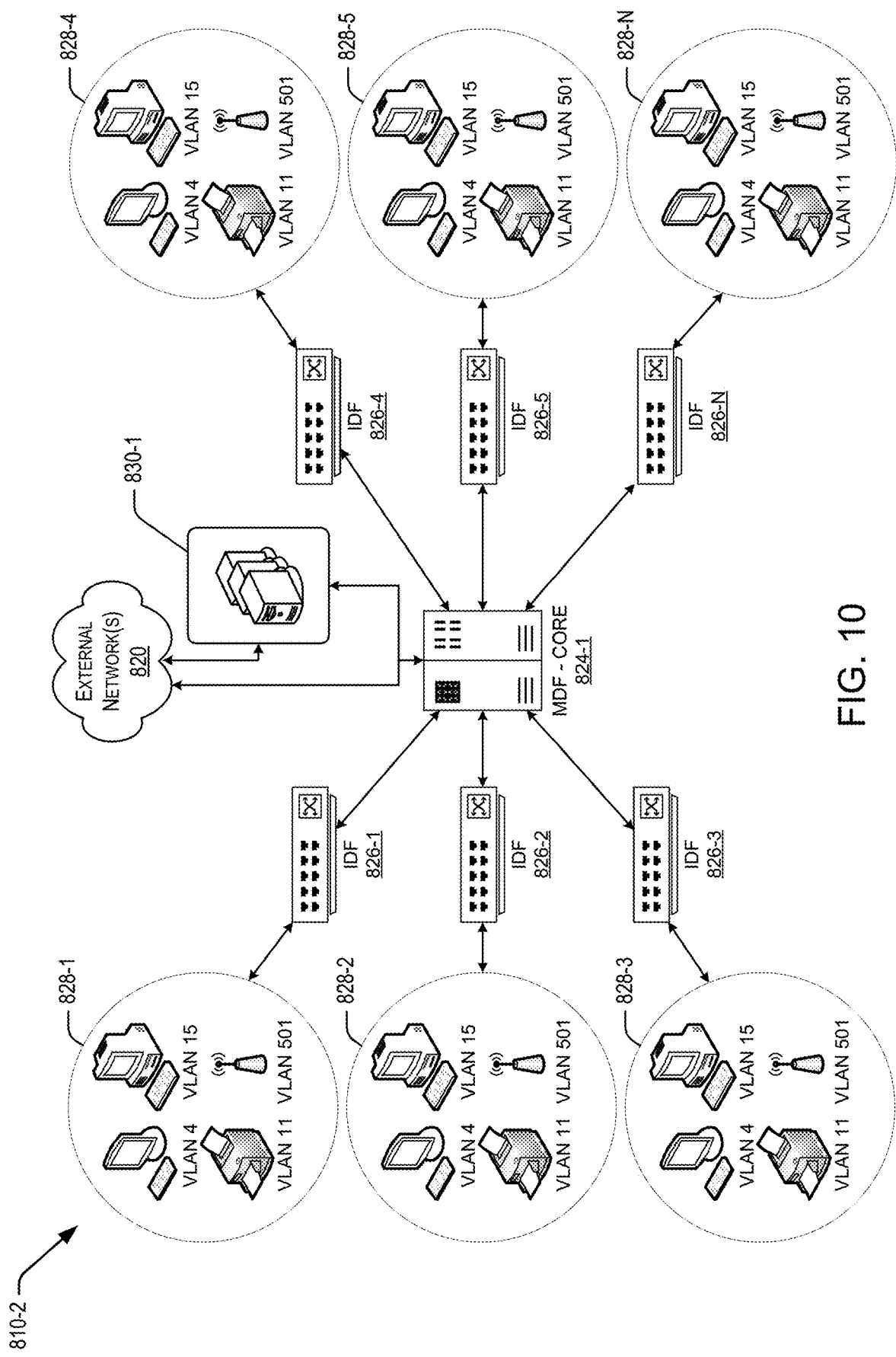
FIG. 10 illustrates one simplified example internal network topology that could be implemented in a facility, in accordance with embodiments of the present disclosure.

FIG. 10 depicts one simplified example internal network 810-2 topology that could be implemented in a facility 110, in accordance with embodiments of the present disclosure. Each VLAN may be assigned a digital identifier, which may be, for example, a numerical identifier similar to the example depicted. While only a few VLAN are illustrated, there may be many VLANs in a hospital, for example, 80 to 100 or more VLANs in a single hospital. The VLANs may be of various distinct types, such as voice VLANs, data VLANs, etc. Each component of a variety of various components 828 (phones, such as VOIP phones; printers; computers, workstations, etc.; multimedia devices; access points with various levels of security such as open, secured guest networks, private networks, etc.; security cameras; servers; etc.) may belong to a VLAN. Some voice VLANs may be dedicated emergency VLANs with Emergency Resource Locator mappings maintained to map various ports and device, which mappings can be shared with local authorities (e.g., municipal authorities) to facilitate emergency communications.

Each switch in an IDF 826 has a respective number of ports. For example, a switch may have 48 ports. One or more of the ports of a switch may be assigned as a member of a VLAN, and different ports of a switch may be members of different VLANs. To keep track of port assignments for various switches, conventional approaches are laborious, error-prone, and deficient in a number of ways. Tracking methods could involve manual tracking and record-keeping. In such cases, verification of port assignments as well as changes to port assignments would require manual efforts and manual changes to records. This can involve physically going to various IDFs in various sites, marking out the former VLAN assignments, and putting in new VLAN assignments, where mistakes can be detrimental and which requires advanced personnel to make changes on physical ports/switches. Such means can be cumbersome, time-consuming, and error-prone, especially with increasing numbers of VLANs.

The technical improvements provided by disclosed embodiments include improvements in accuracy, speed, timeliness, adaptability, and responsiveness in machine-executed gathering of switch data 827A of remotely distributed switches 827, accessing the switches 827, validating switch configurations, properly configuring switches 827 for remote management, emulating the switches, allowing for intelligently controlled changes to switches 827, correcting various switch conditions, among other improvements disclosed herein. For example, disclosed embodiments of the present disclosure may provide for automation on the back-end server system 830 to gather switch data 827A corresponding to a great number of switches 827 in order to facilitate various other features disclosed herein. To facilitate such switch data gathering, as well as the remote management of the switches 827, the server system 830 may perform discovery to determine and validate switch configurations of the switches 827, determine needs for properly configuring switches 827 to perfect interaction with the server system 830, and cause switch configuration of such switches 827. Accordingly, disclosed embodiments may provide for universal switch code-level updates and configuration processes.

With properly configured switches 827 and interaction with the system 830, disclosed embodiments may provide for a universal switch stack emulator. The universal switch stack emulator may provide visualizations and interfaces that allow for accurate presentation of each switch 827 similar to what the switch 827 would look like if one physically walked up to the switch 827 and visually inspected the switch 827, along with features to allow access to corresponding switch data 827A on port-by-port bases. Further, the universal switch stack emulator may provide live views of the switches 827 that accurately represent the states of the switches 827 in real time. Still further, disclosed embodiments may provide for a universal switch stack configurator that allows for the remote management of switches which can include making changes to configurations of switches while enforcing constraints and limitations so as to avoid detrimental changes to critical switch ports and corresponding endpoints, including eliminating or mitigating mistakes in switch port assignments and changes to switch assignments and configurations. As part of enforcing constraints and limitations with the emulator, disclosed embodiments may employ hierarchically scaled criticality control of switches on a port-by-port basis. As part of such remote management of switches 827, the server system 830 may provide for smart alert 1031-8 features that cover a large range of possible conditions that can arise with a non-working switch, a non-responsive switch, abnormal switch operations, or other switch issues. Various embodiments may further provide for port-level and switch-level control, authentication, self-correction, and security operations that are based at least in part on recognition—including sensor-based recognition—of port activity, switch activity, and/or activities in areas proximate to switch stacks.

Figure 11:
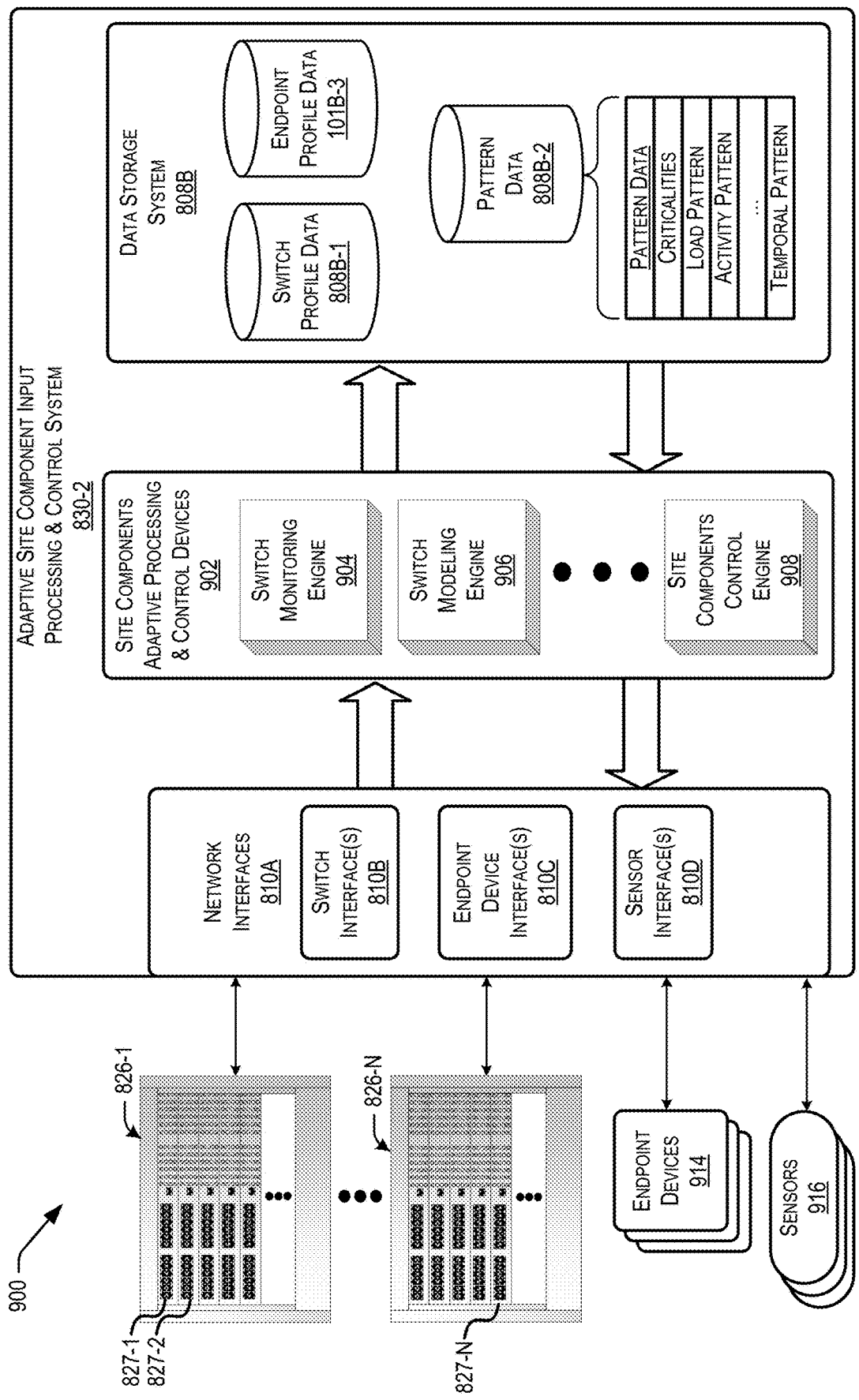
FIG. 11 shows a diagram of aspects of a subsystem to facilitate a universal switch stack emulator and adaptive site component input processing and control, in accordance with embodiments of the present disclosure.

FIG. 11 shows a diagram of aspects of a subsystem 900 to facilitate a universal switch stack emulator and adaptive site component input processing and control, in accordance with embodiments of the present disclosure. The diagram may correspond to various portions of the architecture stack 300. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The subsystem 900 may include the server system 830. The server system 830 may include and be configured to provide an adaptive site component input processing and control system 830-2. The system 830-2 may include a plurality of various network interfaces 810A to communicate with the switches 127, IDFs 826, endpoint devices 914, and sensors 916. The network interfaces 810A may include one or more switch interfaces 810B, endpoint device interfaces 810C, and/or sensor interfaces 810D to transmit to and/or receive communications from one or a combination of the switches 127, the IDFs 826, the endpoint devices 914, and/or the sensors 916. In various embodiments, one or more of the interfaces may include or otherwise correspond to API interfaces to transmit to and/or receive communications from one or a combination of the switches 127, the IDFs 826, the endpoint devices 914, and/or the sensors 916 using APIs.

The endpoint devices 914 may correspond to one or a combination of the user devices 706-714. In various embodiments, the system 830-2 may provide the applications 716-724 to the user devices 706-714, communicate with the user devices 706-714 via the applications 716-724, and/or otherwise facilitate a switch stack emulator interface via the endpoint device interfaces 810C to expose features of the emulator to the user devices 706-714. In some embodiments, the endpoint device interfaces 810C may include the emulator interfaces. In some embodiments, the emulator interfaces may include an API to interact with the server system 830. In various embodiments, the system 830-2 may include, provide, and/or be configured for operation with the emulator interfaces, for example, by making available and/or or communicating with one or more of a website, a web page, a web portal, a web application, a mobile application, enterprise software, and/or any suitable application software to facilitate the emulator interface. In some embodiments, the emulator interface may cause a web page to be displayed on a browser of a user device. The web page(s) may display output and receive input from a user (e.g., by using Web-based forms, via hyperlinks, electronic buttons, etc.). The system 830-2 may provide web applications to a user device for execution in a web browser running on the user device; and the web applications may include scripts, such as Java, JavaScript, etc., for execution within an isolated environment in a browser. A variety of techniques can be used to create the web pages and/or display/receive information, such as JavaScript, Java applications or applets, dynamic HTML and/or AJAX technologies. In some embodiments, the system 830-2 may provide rich-client applications to a user device; and the rich-client applications may be programmed in traditional programming languages to have full access to functions of the operating system running on the user device. In some embodiments, the emulator interface may include or work with a mobile application.

The system 830-2 may include one or more site components adaptive processing and control devices 902. The one or more adaptive processing and control devices 902 may, in some embodiments, be included in the access management engine 602. The one or more site components adaptive processing and control devices 902 may include one or more site monitoring engines 904, one or more switch modeling engines 906, and/or one or more site components control engines 908, which may be separate or integrated in various embodiments. In some embodiments, the site components input processing and control devices 902 may include the aggregation engine 420. In various embodiments, the one or more switch modeling engines 906 and/or the one or more site monitoring engines 904 may include one or more aggregation and/or transformation engines. In various embodiments, the adaptive processing and control devices 902 may correspond to a single, integral engine or separate engines working in conjunction. The adaptive processing and control devices 902 may transform, translate, or otherwise adjust data collected. In various embodiments, the adaptive processing and control devices 902 may correspond to executable code stored in one or more memories communicatively couple with one or more processors, such as those of the system 830-2. In some embodiments, the adaptive processing and control devices 902 may correspond to one or more servers of the server system 830. For example, the server system 830 may correspond to a switch server system, with one or more of the servers being switch servers configured to perform one or more of the switch management features in accordance with embodiments disclosed herein.

Various embodiments of the system 830 may include or at least be communicatively couplable to one or more sensors 916 disposed in and/or about one or more switch stack rooms so that the system 830-2 may receive and utilize sensor data to facilitate the port-level and switch-level control and security features and operations disclosed herein. Various embodiments may include multiple sets of one or more sensors 916, e.g., two, three, four, ten, or many more sets of one or more sensors. For example, several sets of one or more sensors 916 may be configured to capture phenomena at several or many switch stack rooms at one or more facilities. In various embodiments, one or more sets of one or more sensors 916 may be communicatively coupled to the switch stacks and/or may be configured for separate network communication with the system 830-2. In some embodiments, one or more sets of one or more sensors 916 may be integrated with the switch stacks. Additionally or alternatively, one or more sets of one or more sensors may be external to the switch stacks. A plurality of sensors 916 may include different types of sensors 916, each different type of sensor 916 configured to detect a different type of phenomena and/or generate a different type of data based on the detected phenomena. Thus, a multiplicity of integrated and/or non-integrated sensors may be configured to capture phenomena at a switch stack in order to identify aspects of the environment proximate to the switch stack, to facilitate any one or combination of facial recognition, optical recognition, infrared impressions, voice recognition, heat impressions, gestures, and/or the like.

Such sensor data can be gathered and reported upon occurrence of a triggering event, such as a dropping of a feed to a critical endpoint (e.g., ICU), a detection of motion and/or unusual activity in the switch stack room, and the like. The system 830-2 can analyze the sensor data to develop baseline activity profiles and then detect aberrations with respect to the baselines. Any one or a combination of the detected sensor data, sensed patterns/baselines, detected inconsistencies/nonconformities, and/or composites based thereon can be exposed via one or more endpoint devices and/or the emulator interface.

The system 830-2 may be configured to communicate with multiple different sensors 916. Such communication may use various communication standards or protocols. In various embodiments, for example, the sensors 916 can be communicatively connected to and controllable by the system 830-2. Sensors and control units may be coupled and the sensors 916 may be connected in a serial, parallel, star, hierarchical, and/or the like topologies and may communicate to the system 830-2 via one or more serial, bus, or wireless protocols and technologies which may include, for example, WiFi, CAN bus, Bluetooth, I2C bus, ZigBee, Z-Wave and/or the like. For instance, one or more sensors 916 may use a ZigBee® communication protocol while one or more other sensors 916 communicate with the system 830-2 using a Z-Wave® communication protocol. Other forms of wireless communication may be used by sensors 916 and the system 830-2. For instance, one or more sensors 916 and the system 830-2 may be configured to communicate using a wireless local area network, which may use a communication protocol such as 802.11.

In some embodiments, one or more separate devices may be connected with the switch stack and/or the system 830-2. In some embodiments, one or more separate devices may be connected with the switch stack and/or the system 830-2 to enable communication with authentication control devices. For instance, a communication device may be attached to the switch stack and/or the system 830-2. The communication device may be in the form of a dongle. The communication device may be configured to allow for ZigBee®, Z-Wave®, and/or other forms of wireless communication. The communication device and/or one or more sensors 916 may connect with the switch stack and/or the system 830-2 via a USB port or via some other type of (wired) communication port. The communication device and/or one or more sensors 916 may be powered by the switch stack and/or the system 830-2 or may be separately coupled with a power source. In some embodiments, the switch stack and/or the system 830-2 may be enabled to communicate via a local wireless network and may use the communication device in order to communicate with sensors 916 that use a ZigBee® communication protocol, Z-Wave® communication protocol, and/or some other wireless communication protocols.

The one or more sensors 916 may include, for example, one or more cameras. The camera(s) can be any device configured to generate image and/or audio data including, for example, still image data, video image data, and/or any sound data, corresponding to detected phenomena. The camera(s) may, in some embodiments, include infrared sensors. The camera(s) may provide a video and, in some embodiments, an audio stream. The one or more sensors 916 may include one or more microphones and/or another audio sensor (which may or may not be dedicated to capturing audio data for audio analysis). The one or more sensors 916 of different types may include infrared sensors, heat sensors, and/or other sensors configured to monitor a characteristic of an ambient environment (e.g., motion, light, vibration, temperature, humidity, and/or the like). In some embodiments, the camera(s) may include one or more infrared cameras.

Sensor data 916A from sensors 916 may be recorded by the switch stack and/or the system 830, and/or storage on external storage devices, such as a network attached storage device. For example, video may be transmitted across the local and/or wide area network to other storage devices upon occurrence of a trigger event for later playback. The sensors 916 may be selectable via the emulator interface (e.g., by sensor IP address, location, associated switch stack, etc.) for activation and/or accessing of sensor data. By way of example, video and, in some embodiments, audio from sensors 916 may be available live for viewing/listening via the emulator interface such that the emulator interface provides an integrated sensor data view and/or access interface. In some embodiments, video and/or audio may only be presented upon occurrence of a trigger event (e.g., a detected inconsistency/nonconformity with respect to a particularized pattern/baseline). In various embodiments, such recording may or may not be constrained by a rolling window associated with a triggering event being detected. Also, sensor data may be recorded based upon a timer, remote command, and/or a randomized interval function.

A sensor 916 and/or a component 102 communicatively coupled thereto may be configured to transmit electronic communications to one or more other electronic devices, which may include transmitting sensor input to the system 830-2 upon trigger events as disclosed herein. The electronic communications may be transmitted to the system 830-2, for example, upon detecting a new type of signal; continuously; at regular times or intervals; upon receiving a request; and/or upon detecting that a transmission condition has been satisfied. The electronic communication may include, for example, sensor-collected data, inputs received at a component, an indication that an event has been detected, an indication that a transmission condition has been satisfied, an identifier of the component or sensor, and/or a location of the component or sensor.

Figure 12:
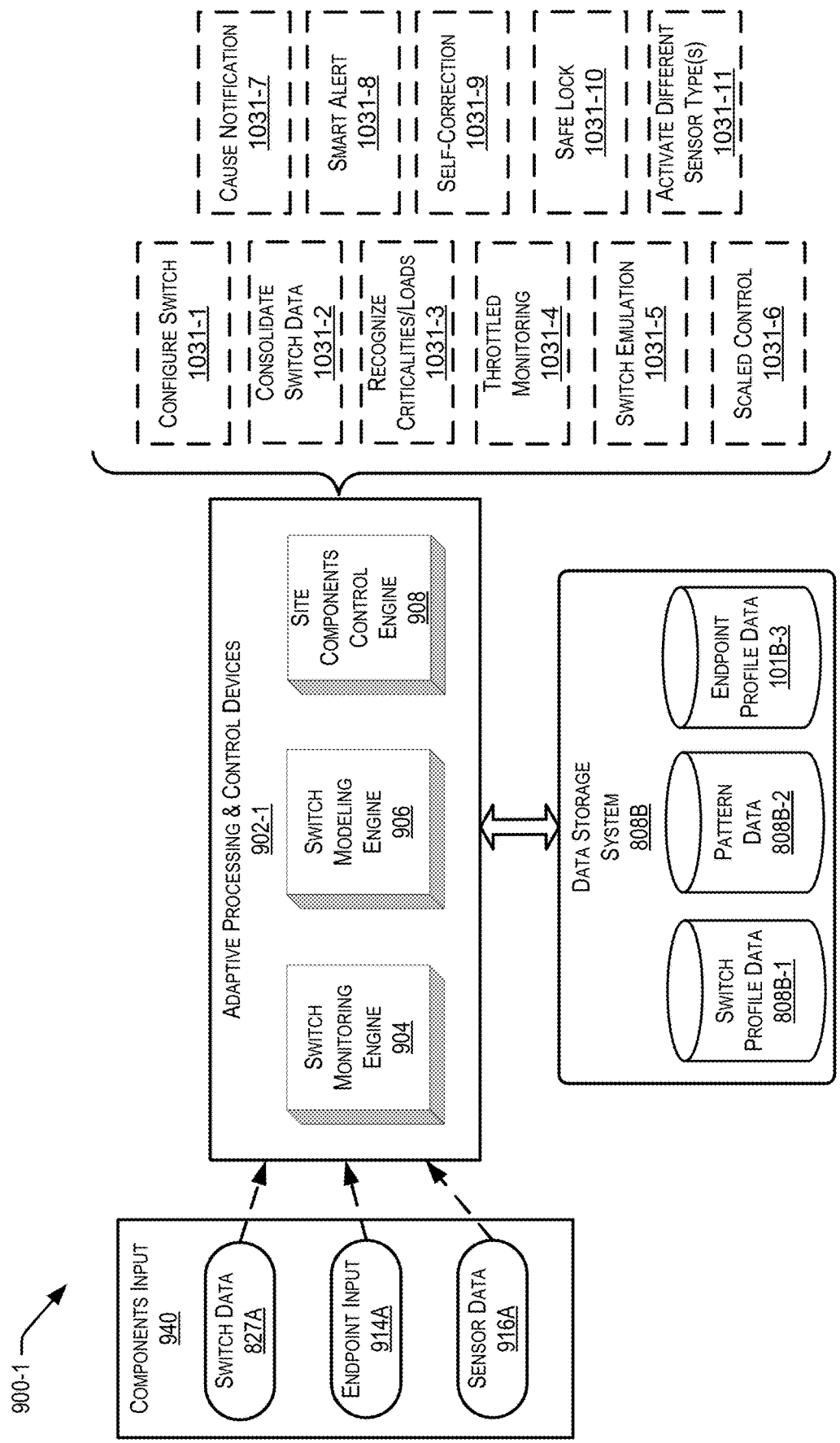
FIG. 12 shows a functional diagram of aspects of the subsystem, in accordance with embodiments of the present disclosure.

FIG. 12 shows a functional diagram of aspects of the subsystem 900, in accordance with embodiments of the present disclosure. The system 830-2 may be configured to provide a number of adaptive controls 1031 with one or a combination of the emulator, the switches 127, the IDFs 826, the endpoint devices 914, and/or the sensors 916 as disclosed herein. The one or more adaptive processing devices 902-1 may be communicatively coupled with interface components and communication channels (which may take various forms in various embodiments as disclosed herein) configured to receive components input 940. The monitoring engine 904 may be configured to monitor the components input 940 for any suitable aspects to facilitate improvements with individualization adaptation features disclosed herein. The components input 940 may include input from a plurality of different data sources. The technical improvements provided by the system 830-2 over prior technologies include improvements in emulation accuracy, adaptability, and control at least in part by machine-intelligent handling input from multiple different sources, including the emulator interface 1100, the switches 127, the IDFs 826, the endpoint devices 914, and/or the sensors 916 in order to adapt to various particular changes in technical environments, as is disclosed further herein.

As depicted, the components input 940 may include switch data 827A, endpoint data 914A, and/or sensor data 916A. The system 830-2 may process and analyze switch data 827A, endpoint data 914A, and/or sensor data 916A to provide for features disclosed further herein. The components input 940 may include endpoint device input 914A that may include input from one or more endpoint devices 916, which could correspond to input from one or more other sources that may include input from an administrator device and/or another network-accessible endpoint accessing switch data via the emulator interface. The sensor data 916A may be captured by any one or combination of the sensors/detectors 916 disclosed herein.

In various embodiments, the components input 940 from the one or more data sources may be retrieved and/or received by the devices 902-1 via one or more data acquisition interfaces, which may include interfaces of the one or more adaptive processing devices 902-1, components of the system 830-2 and the system 100, 200, and/or the like—through network(s) 236, 810, and/or 820, through any suitable means for direct communication, and/or through any other suitable means of transferring data. According to disclosed embodiments, data pulled and/or pushed from the one or more data sources may be transformed and the transformed data and/or other data generated based thereon may be made available by the one or more adaptive processing devices 902. As disclosed herein, in some embodiments, the one or more data acquisition interfaces may include one or more APIs that define protocols and routines for interfacing with the data sources (e.g., sensors, computing devices, communication devices, wearable devices, remote data sources, and/or the like). The APIs may specify API calls to/from data source components and/or systems. In some embodiments, the APIs may include a plug-in to integrate with an application of a data components and/or systems. The one or more data acquisition interfaces, in some embodiments, could use a number of API translation profiles configured to allow interface with the one or more additional applications of the data sources to access data (e.g., a database or other data store) of the data sources. The API translation profiles may translate the protocols and routines of the data source component and/or system to integrate at least temporarily with the system and allow communication with the system (one-way communication to the system and/or two-way communication with system in various embodiments) by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

To facilitate the emulator tool, the system 830-2 may communicate with a plurality of switches 827 throughout the internal network 810. The plurality of switches 827 may correspond to all of the switches 827 in the internal network 810 or a subset of the switches 827 in the internal network 810, in various embodiments. Various subsets of the switches 827 may each correspond to individual switch stacks, for example, in IDFs 826. Each of the switches 127 and/or IDFs 826 may be capable of transmitting switch data 827A, and may include network interfaces that may include one or more API interfaces to transmit to and/or receive communications from the system 830-2 using APIs. Thus, the one or more switch interfaces may include one or more APIs that define protocols and routines for interfacing with the switch data 827A sources via an API interface. The APIs may specify API calls to/from the switch data 827A sources. In various embodiments, Secure Shell (SSH), Telnet, Simple Network Management Protocol ("SNMP"), and/or any other suitable protocol may be used to facilitate communications between the system 830-2 and the switches 127 and/or IDFs 826. By way of example, to gather switch data 827A, the system 830-2 may run one or more scripts (e.g., Tcl scripts), select one or more switches 127, establish one or more communication pipes to the one or more switches 127, log into the one or more switches 127 for command line access via a transport layer by, for example, IP address and SSH or Telnet, and pull switch data 827A from the one or more switches 127.

In various embodiments, the one or more switch interfaces could use a number of API translation profiles configured to allow the server system 830 to interface with the switch data 827A sources. For example, the server system 830 may use API translation profiles to translate the protocols and routines of the data source system to integrate with the system and allow communication with the system 830 by way of API calls. In some embodiments, at least a subset of the switches 127 and/or IDFs 826 may be configured to execute software (e.g., one or more applications and/or other interfaces) developed for interacting with the server system 830 (which may correspond to the transformative integration engine 102). In various embodiments, the switches 127 and/or IDFs 826 may be running software, e.g., developed in Linux, in some instances, and may be configured to send calls via the API to send messages any time a trigger event is detected.

As a universal switch stack configurator, the system 830-2 may facilitate switch code-level updates. In various embodiments, the system 830-2 may perform switch configuration setup processes 1031-1 to facilitate switch management features disclosed herein. For example, when interfacing with a switch 127, the system 830-2 may perform discovery to determine and validate a switch configuration. The system 830-2 may communicate with each of the switches 127 via the network 810 and/or 820 and validate switch configurations corresponding to at least some of the plurality of switches 127 as being configured with software that allows for remote management of the switches 127 by the system 830-2 in accordance with embodiments disclosed herein. For example, the switch configuration may allow for the transmission of switch data 827A from the switches 127 to the system 830-2 and for the control of the switches 127 by the system 830-2 disclosed herein.

The switch configuration validation may include one of the adaptive processing and control devices 902 determining whether the switch 127 has previously interacted with the system 830-2 at least partially by searching switch data 827A records maintained by the system 830-2 to identify preexisting records for the switch 127. In the case that the endpoint device is recognized as properly configured for interacting with the system 830-2, the site components input processing and control device(s) 902 may initiate further switch data 827A gathering with respect to the switch 127. However, in the case that the switch 127 is not recognized by the system 830-2 as properly configured for interacting with the system 830-2, the site components input processing and control device(s) 902 may determine a need for switch configuration and may initiate switch configuration processes 1031-1. The system 830-2 may receive configuration information from at least a subset of one or more switches 127 of the plurality of switches 127. The system 830-2 may compare the received configuration to a stored set of configuration specifications that specify minimum configuration requirements. Based at least in part on the comparison, the system may 830-2 identify the subset of one or more switches 127 of the plurality of switches 127 as not satisfying the minimum configuration requirements.

This phase may, for example, correspond to a switch 127 not meeting minimum configuration requirements, such as not having an appropriate API and/or requiring a code-level update (e.g., in order to support the script protocol, such as Tcl). In some embodiments, one of the adaptive processing and control devices 902 may perform discovery to pull configuration data from the switch 127 that indicates configuration specifications such as a code level, version, etc. In some embodiments, one of the adaptive processing and control devices 902 may perform discovery to determine existence of a description file and/or API document or request/pull the description file and/or API document from the switch 127. If a description file and/or API document is available, the site components input processing and control device(s) 902 may receive and process it to determine a configuration 1031-1 needed. If a description file and/or API document is not available, the site components input processing and control device(s) 902 may, in some embodiments, specify integration actions 1031-1 needed to be performed to configure the switch 127.

When the switch 127 is determined to not meet minimum configuration requirements, the system 830-2 may execute one or more integration processes to configure the switch 127. The one or more integration processes may be performed automatically and may be initiated remotely by the system 830-2 when the processes do not disrupt critical and/or other operations having a higher priority than the integration. The integration processes may, in various embodiments, include transmitting one or a combination of an API document, an API translation profile, a code update or other code portion, a module, a plug-in, an application, a software development kit (SDK), and/or the like for installation and use by the switch 127 to meet the minimum configuration requirements. Accordingly, the integration processes may, in some embodiments, translate the protocols and routines of the switch 127 to integrate with the system 830-2 and allow communication with the system 830-2 (e.g., by way of API calls).

The system 830-2 may deploy and cause installation of the configuration package when the system 830-2 determines that the one or more integration processes will not disrupt critical and/or other higher-priority operations. For example, the system 830-2 may determine that the switch 127 only supports low-level criticality operations based at least in part on identifying criticality attributes gathered and/or stored by the system 830-2 for the switch 127. For example, the system 830-2 may receive input regarding the criticalities of the switch 127 from one or more endpoint devices (e.g., an administrative device). For the gathering of input, the system 830-2 may facilitate an interface that may include providing one or more display screen images that may each include one or more user interface elements. The user interface may include any text, image, and/or device that can be displayed on a display screen for providing information to a user and/or for receiving user input. The user interface may include one or more widgets, windows, dashboards, text, text boxes, text fields, tables, grids, charts, hyperlinks, buttons, lists, combo boxes, checkboxes, radio buttons, and/or the like. The input may be provided with indications of criticalities of various switches that the system 830-2 may use to populate in a table or other record to be stored by the system 830-2.

The system 830-2 may execute switch data gathering and consolidation processes 1031-2 with respect to switch data 827A from the remote switch stacks. Disclosed embodiments may provide for automation on the backend to pull switch data 827A for aggregation and consolidation to facilitate various features disclosed herein. For example, the adaptive processing and control devices 902 may utilize any one or combination of the interfaces disclosed herein as one or more switch interfaces configured to allow the adaptive processing and control devices 902 to gather data from switch data 827A sources corresponding to any one or combination of the switches 827, IDFs 826, and corresponding switch stacks to facilitate the emulator features disclosed herein.

To gather switch data 827A, the system 830-2 may execute one or more processes that access the core(s) 824 and/or switches 127 at each site. In some embodiments, the system 830-2 may include specialized data-pulling engines and/or stream processing engines (e.g., each engine being a server or processing core), such as the switch monitoring engine 904. According to certain embodiments, with data-pulling engines, at least some of the data may be actively gathered and/or pulled from one or more of the switch data 827A sources, for example, by "crawling" various repositories, which may correspond to the switches 827 and/or the switch stacks of the IDFs 826. A stream processing engine may be specialized so as to include, for example, stream processors and fast memory buses. In some embodiments, data elements of the received data may be separated, for example, within a stream via a particular (or one of multiple particular) characters or strings, or data elements may begin or end with a particular (or one of multiple particular) characters or strings.

In various embodiments, a management information database ("MIB") walk may be performed for each switch 127 that has a SNMP MIB to canvass the elements of the MIB and pull switch data 827A. While various embodiments may employ SNMP, other embodiments may employ different protocols suitable for network monitoring. Each MIB may include a collection of switch data 827A and definitions of switch data 827A properties available on a given switch 127 that may facilitate managing switches 127 in the network. Managed objects in a given MIB may be defined using Abstract Syntax Notation One ("ASN.1") and may be identified with object identifiers ("OIDs") that uniquely identify the managed objects in the MIB. A MIB compiler may perform the parsing of the objects, and each switch may have an SNMP agent on it that may correspond to a software module that translates switch information into an SNPM-compatible format. With a MIB walk, each element of the MIB may be accessed until specified OID parameters and/or types of data are accessed and identified. For example, the switch data 827A gathered may include address specifications, such as IP addresses and MAC addresses, and/or other types of switch data 827A disclosed herein. In some embodiments, the system 830-2 may pull back one or more switch MAC tables and store the one or more tables and/or data extracted therefrom with one or more corresponding switch profile records 808B-1. The system 830-2 (e.g., the switch modeling engine 906) may identify types of parameters corresponding to gathered switch data 827A, for example, by mapping identifiers (e.g., OIDs, table field identifiers, and/or the like) to corresponding fields of switch profiles 808B-1 based at least in part on code matching, an identifier key, and/or the like.

Various embodiments may implement such processes as part of an initialization phase to initially gather switch data 827A from one or more switches. Such processes may solve various problems that may be encountered, especially with large facilities with large numbers of devices and corresponding items of device information (e.g., addresses), say, on the order of thousands or more. Using other means of communicating with switches, such as SSH sessions, may be inefficient and fraught with other issues such as not being able to fully transmit tables due to limitations on the sessions, bandwidth, buffering capabilities, and/or the like, especially in view of large amounts of switch data 827A where each switch may have switch data 827A for 1000 or more elements corresponding to various switch parameters, for example. Additionally, various embodiments may further implement such processes periodically or intermittently after initialization to supplement switch data 827A gathered by the system 830-2 and stored in switch profiles 808B-1. However, after the initialization phase, various embodiments may utilize a different protocol (e.g., SSH, Telnet, and/or the like) to gather supplemental switch data 827A in accordance with various trigger-based updating and real-time updating features disclosed herein. As disclosed herein, for example, the system 830-2 may run one or more scripts, establish one or more communication pipes to one or more switches 127, log into the one or more switches 127 via, for example, IP address and SSH or Telnet, and pull switch data 827A from the one or more switches 127. As the system 830-2 aggregates switch data 827A, the modeling engine 906 may consolidate gathered switch data 827A into the switch profiles 808B-1, which may include matching items of gathered switch data 827A that may be obliquely identified by the switches 127 to field identifiers in the switch profiles 808B-1, identifying and discarding redundant data and/or data not specified for retention in the switch profiles 808B-1, converting and/or translating items of data into forms, formats, and units specified for the fields of the switch profiles 808B-1 (e.g., language translation, numeral system conversion, numeral formatting, significant figures modification, precision tailoring, measurement unit conversion, timestamp formatting and conversion, etc.), and/or the like.

Further, the system 830-3 may use the modeling engine 906 to recognize criticality and/or load indicia 1031-2 of the criticalities of switches from identifiers of downstream lines and/or the types of loads fed by the downstream lines which the modeling engine 906 may recognize from the switch data 827A by code mapping, keyword recognition, and/or another suitable method of recognition. In various embodiments, the recognition processing 1031-3 of switch data 827A may identify keywords and/or codes as distinctive markings, compile them, and correlate them with recognition criteria (e.g., keyword criteria and/or code system) for the purposes of characterizing each set of switch data 827A and generating correlation results. Such recognition processing 1031-3 may be performed in real time. The recognition criteria may include keywords identified by any one or combination of words, word stems, phrase, word groupings, and/or like keyword information. The recognition criteria may include weighting assigned to words, word stems, phrase, word groupings, and/or the like. For example, a keyword may be assigned a weight according to its significance. Increased word weights may be tied to increasing probability of criticality. The recognition criteria may correspond to one or more keyword schemas that are correlated to various criticalities. The recognition criteria may correspond to any other suitable means of linking, for example, via a code system, that may be used to associate recognized codes to specific criticalities.

Additionally, various embodiments may provide feedback options via the interface(s) for one or more endpoint devices 914 (e.g., an administrative device) regarding correlation results determined by the modeling engine 906 via the recognition processing. Questions and/or user-selectable options may be provided to allow user feedback information about the determinations provided by the system 830. The feedback may be used for training the modeling engine 906 to heuristically adapt code mapping, keyword recognition, and criticality characterizations, and, over time, accumulate, identify, and use the feedback to perform the mapping, recognition, and/or characterizing more effectively.

Some embodiments may perform integration 1031-1 that is a function of a criticality score and that performs appropriate integration depending on the criticality score meeting one or more thresholds and corresponding to one or more categories of criticality (e.g., low criticality, medium criticality, high criticality, and/or designations of peak or off-peak times of criticality). In some embodiments, the system 830-2 may communicate with an IDF 826 and/or the MDF 824 to gather data regarding the criticalities of the switch 127 in implementations where indicia of the criticalities of various downstream lines are retained by the IDF 826 and/or the MDF 824. In some instances, the indicia of the criticalities may correspond to designations of downstream lines and/or the types of loads fed by the downstream lines which the system 830-2 may recognize by code mapping, keyword recognition, and/or another suitable method of recognition. The categories of criticality and/or the indicia of the criticalities of particular switch ports may be specified by criticality attributes mapped to the particular switch ports. The criticality attributes for ports of a switch may be stored by the system 830-2 (e.g., as field values) in a switch profile data structure 808B-1 particularized to the switch.

As another example, the system 830-2 may transmit a notification to an endpoint device 914 (e.g., an administratory device) to prompt input with one or more user-selectable options as to the criticalities of the switch, according to which input the system 830-2 may initiate integration processes. For example, the input may specify scheduled time to initiate the integration 1031-1. In addition or in alternative, the system 830-2 may specify, with one or more notifications, procedures needed to be initiated by the endpoint for full installation and configuration for interacting with the system 830-2. With switches 127 properly configured for interacting with the system 830-2, the system 830-2 may proceed to communicate with the switches 127 to facilitate the emulator tool.

In the illustrated simplified example, the system 830-2 may include a data storage system 808B. In various embodiments, the data store system 101B may correspond to one or a combination of the data storage servers 808(1)-808(N) and/or the data store 508. In various embodiments, the data store system 101B may include one or more databases that may reside in a variety of locations. By way of example, one or more databases may reside on a non-transitory storage medium local to (and/or resident in) the system 830-2. Alternatively, databases may be remote from the system 830-2 and in communication with the system 830-2 via a network-based or dedicated connection. In one set of embodiments, databases may reside in a storage-area network (SAN). Similarly, any necessary files for performing the functions attributed to the system 830-2 may be stored locally on the system 830-2 and/or remotely, as appropriate. In one set of embodiments, the databases of the data store system 101B may include relational databases that are adapted to store, update, and retrieve data in response to SQL-formatted commands.

The switch data 827A gathered from the switches/switch stacks/IDFs may, for example, include model numbers identified for various switches. Having received and processed the data for a particular switch, the system 830-2 (e.g., the switch modeling engine 906) may identify a particular switch model identifier (e.g., a model number, serial number, name, etc.) based at least in part on the gathered data. The system 830-2 (e.g., the switch modeling engine 906) may retrieve switch-specific specifications corresponding to the model and may further pull particular types of switch data 827A from the particular switch that would not otherwise be remotely available. The pulled switch data 827A may include port configuration and summary data, such as: whether each port is alive, in which VLAN it is, device IP address, device MAC address, status on port (e.g., indicia of whether there are any errors), change history, and/or the like. Based at least in part on the retrieved switch-specific specifications and the pulled switch data 827A, the system 830-2 (e.g., the switch modeling engine 906) may model each switch 827, which models may correspond to the switch profiles and store the models as switch profiles 808B-1. Each switch profile 808B-1 may include or be a corresponding switch model to facilitate emulation of the respective switch 827. Using the switch data 827A and switch profile 808B-1, the system 830-2 (e.g., the switch modeling engine 906 and/or the interface engine 702) may create a visualization of the particular switch, a graphical representation formatted to emulate the particular switch. The switch emulation 1031-5 may provide for a remote switch interface allows for management of switch stacks remotely located in one or more facilities, including communication with remote switch stacks and making remote changes to switch configurations while enforcing constraints and limitations particular to the switch stacks on a port-by-port basis to, for example, prohibit changes that would result in taking down or otherwise negatively impacting performance of critical servers, switches, computers, etc.

The switch data 827A may be gathered from the switches/switch stacks/IDFs in real time, periodically, or when triggered by certain events with respect to the particular switches/switch stacks/IDFs. For example, the system 830-2 may aggregate switch data 827A periodically, according to a schedule. Additionally, the system 830-2 may aggregate switch data 827A in response to user access of the emulator tool. For example, when a user accesses the tool and a certain facility is selected, the system 830-2 may aggregate switch data 827A from switches of the facility which aggregated switch data 827A the system 830-2 may use to update switch data 827A previously gathered for the facility in order to generate visualizations for the facility with the updated data. As another example, when a user accesses the tool and a certain IDF is selected, the system 830-2 may aggregate switch data 827A from switches of the IDF in order to update switch data 827A previously gathered for the switches in order to generate visualizations for the switches with the updated data. As yet another example, the emulator tool may provide one or more user-selectable options which a user of the tool may select in order to refresh the switch data 827A for one or more switches emulated with the tool.

In some embodiments, with a large number of a switches, not all the switches need to be polled constantly or equally, but certain switches could have a higher polling priority than others. Based at least in part on the pattern data 808B-2 for particular switches, the switch modeling engine 906 may learn, for example, which switches have a higher priority (e.g., as a function of the criticality attributes of the switches) and/or which have port changes with respect to any one or a combination of the switch data 827A aspects with greater frequency and/or on a more regular basis. Accordingly, the system 830-2 (e.g., the switch monitoring engine 904) may intelligently adapt polling of switches for switch data 827A to focus on certain switches more than on other switches at certain times based at least in part on the pattern data 808B-2.

In some embodiments, the switch modeling engine 906 may be configured to employ deep learning to process the switch data 827A and derive the particularized pattern data 808B-2. Accordingly, the switch modeling engine 906 may facilitate machine learning or, more specifically, deep learning, to facilitate creation, development, and/or use of particularized pattern data 808B-2. The switch modeling engine 906 may include a reasoning module to make logical inferences from a set of the detected and differentiated data to infer one or more patterns of change for particular switches. A pattern-based reasoner may be employed to use various statistical techniques in analyzing the data in order to infer particularized pattern data 808B-2 from the observation data. A transitive reasoner may be employed to infer relationships from a set of relationships related to the observation data. In various embodiments, the system automatically establishes and develops the particularized pattern data 808B-2.

The switch profile data 808B-1 may include particularized profiles for a plurality of switches tracked, aggregated, consolidated, and learned on a per-switch basis and mapped to particular switches. Each particularized profile may correspond to a tracked, aggregated, and consolidated set of records for a particular switch that may be stored in one or more tables or other types of record formats. Thus, for example, MAC information and other switch data 827A may be stored in a table to facilitate switch emulation 1031-5 and other features disclosed herein. Accordingly, when a switch view is generated with the emulator, the mapping may be scanned and attribute values may be matched with ports. Among other things, this enables the hover-to-reveal port features with the interface to view information such as MAC address and IP address. With respect to a particular switch, switch profile data 808B-1 may include one or a combination of port configuration and summary data; endpoint devices, switches, and/or access points profile data; temporal profile data; and/or the like. The switch modeling engine 906 may include logic to implement and/or otherwise facilitate any taxonomy, classification, categorization, correlation, mapping, qualification, scoring, organization, and/or the like features disclosed herein. In various embodiments, the switch modeling engine 906 may be configured to analyze, classify, categorize, characterize, tag, and/or annotate port configuration and summary data; endpoint devices, switches, and/or access points profile data; temporal profile data; and/or the like. The switch modeling engine 906 may employ one or more artificial intelligence (machine learning or, more specifically, deep learning) algorithms to perform pattern matching to detect patterns of switch metrics of the switches.

The endpoint devices, switches, and/or access points profile data may include tracked, aggregated, consolidated, and learned endpoint data 808B-3 to facilitate detection, recognition, differentiation, configuration, and/or capabilities of endpoint devices, switches, and/or access points mapped to particular switches and ports. The endpoint profile data may include correlated data sets of one or a combination of configuration data, descriptions and identifiers, endpoint types, specifications, destination specifications, and/or the like. The switch modeling engine 906 may map multiple endpoint devices, switches, and/or access points, along with the pertinent sets of endpoint device profile data 808B-3, to a single switch that is connected to the endpoint devices, switches, and/or access points. The temporal pattern data 808B-2 may include tracked, aggregated, consolidated, and learned device temporal data to facilitate detection, recognition, and/or differentiation of temporal aspects mapped to particular switches and ports and endpoint devices, switches, and/or access points profile data sets 808B-3 to facilitate chronotyping of switches and ports. To refine the chronotyping, the temporal profile data 808B-2 may include correlated data sets of one or a combination of date information, time of day information, time of week information, time of year information, time of month information, holiday information, and/or the like correlated to the port changes with respect to any one or a combination of the switch data 827A aspects.

Having generated, developed, and/or otherwise used the switch profile data 808B-1 to develop the particularized pattern data 808B-2 to identify which switches have a higher priority and/or which have port changes with respect to any one or a combination of the switch data 827A aspects with greater frequency and/or on a more regular basis, the system 830-2 (e.g., the switch monitoring engine 904) may intelligently adapt polling of switches for switch data 827A to focus on certain switches more than on other switches at certain times based at least in part on the pattern data 808B-2. In some instances, a higher priority may be assigned to switches that serve loads of higher criticality that meet one or more criticality thresholds as disclosed herein. Additionally or alternatively, a higher priority may be assigned to switches that have patterns of changes with frequencies of change that satisfies one or more frequency thresholds. Additionally or alternatively, the polling of certain switches may be tailored according to certain temporal patterns of change (e.g., observed times of peak changes) and corresponding chronotypes based at least in part the temporal data 808B-2. In so doing, the system 830-2 may follow one or more protocols that are based at least in part a precedence order that is a function of the foregoing variables.

Further, in some embodiments, the system 830-2 (e.g., the switch monitoring engine 904) may spin up one or more agents to monitor one or more of the switches for changes by polling the switches on regular and/or periodic bases. Such an agent may, in various embodiments, correspond to a bot, a listener, and/or the like, and may conform ITI-41, HL7 v.2, HL7 v.3, C-CDA, NEMSIS, FHIR, XDs.b, XDR, or other suitable protocols. In some embodiments, the system 830-2 may utilize one or more agents for subset of the switches that have been identified as higher priority for more frequent, constant, and/or real-time monitoring. Accordingly, in some embodiments, the system 830-2 may tailor monitoring based at least in part on observed attributes of the switch. Further, with some embodiments, the integration processes disclosed herein may configure one or more switches to self-report by sending updates upon occurrence of trigger events (e.g., state changes). For example, in some embodiments, an agent may be configured to run on a switch to monitor the switch for state changes with respect to one or combination of the switch data 827A aspects and to trigger notification transmissions to the system 830-2 when the agent detects a state change.

Some embodiments may employ throttled monitoring 1031-4 as a function of state changes detected with particular switches. For example, when switch data 827A gathered for particular switch indicates a state change with respect to one or a combination of the switch data 827A aspects, the monitoring engine 904 may initiate accelerated monitoring for that switch for a certain time period following the detection of the state change in order to capture any further state changes that may occur within that time. Various embodiments may employ various time periods (e.g., an hour, day, etc.). The accelerated monitoring may take the form of one or combination of the aforementioned monitoring schemes to all the switch on a more frequent basis for the duration of the time. In the event that no further state change is detected during the time period, various embodiments may cease the accelerated monitoring and return to the previous monitoring frequency for the switch or may gradually decrease monitoring frequency for one or more additional time periods to ultimately return to the original monitoring frequency for the switch when no further state changes detected. However, in the event that one or more additional state changes are detected, various embodiments may continue or increase the accelerated monitoring frequency for the time period and/or one or more additional time periods until the second stage of his return to frequencies that satisfy one or more low-activity thresholds for certain time periods, at which time the monitoring engine 904 may cease or gradually decrease the accelerated monitoring frequency. Accordingly, among the technical improvements provided by the system 830-2 may be appropriate multi-stage, multi-modal monitoring and authentication in real-time that can include multi-stage, multi-modal monitoring where multiple stages of monitoring with different types of sensors are intelligently activated in different ways, at different times, at adjusted sampling rates, and then triggering differentiated control measures that correspond to real-time adjustments and enhanced authentication measures when phenomena detected in real-time do not conform to the patterns, in order to capture additional data, develop the learned patterns, lock down or otherwise prohibit access to resources, alert administrative devices, and/or the like disclosed herein. Further, among other things, the technical improvements provided by disclosed embodiments solve problems associated with adaptive systems and multiplicities of sensor data being extremely computing-resource intensive—which can be especially problematic at scale when many devices are involved. While processing sensor-based data from a multiplicity of sensors can be extremely computing-resource intense, disclosed embodiments with selective, multi-stage authentication can require significantly fewer computing resources than otherwise and increase operational speed to provide for intelligent and faster management while performing operations as disclosed herein.

Figure 13:
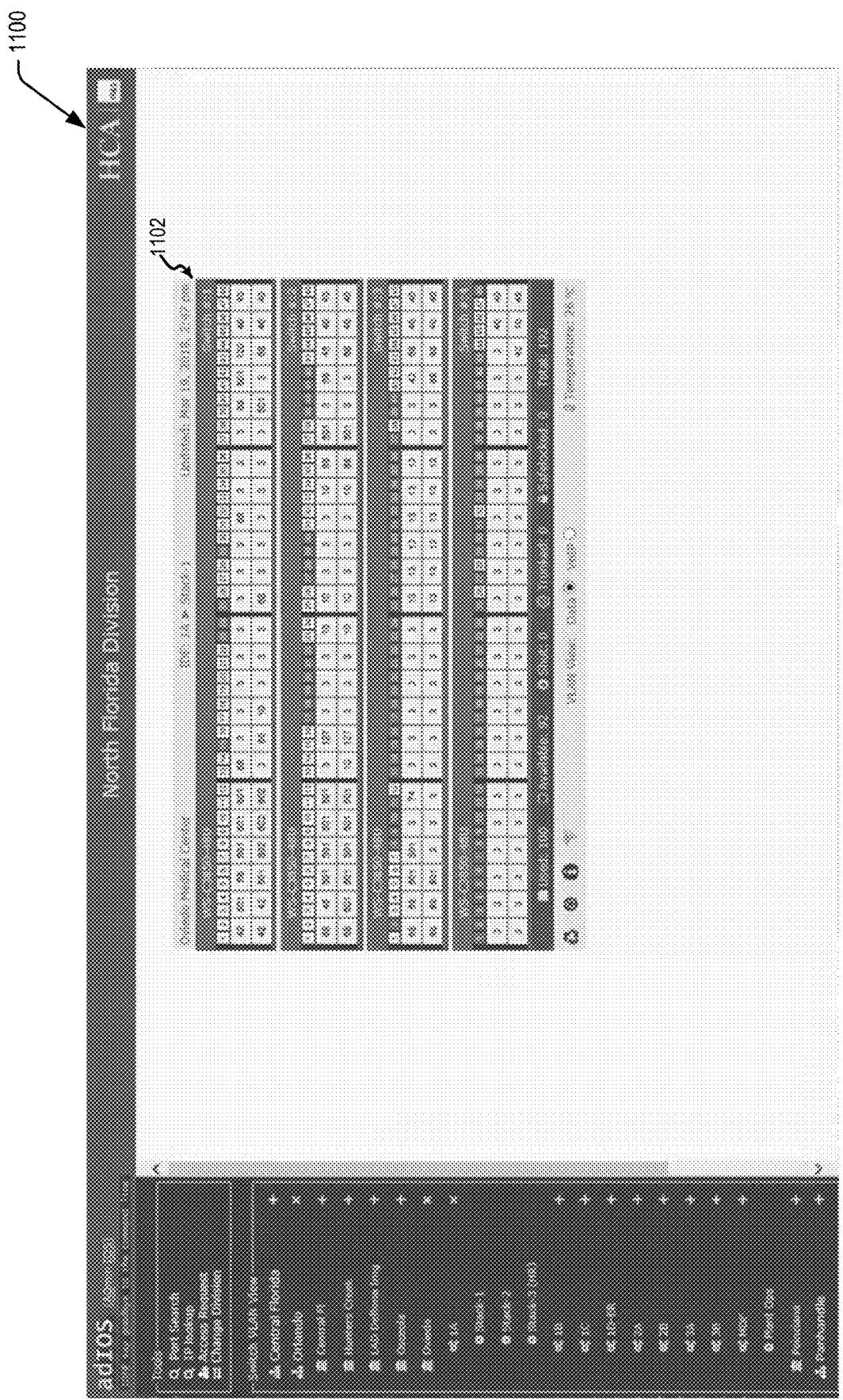
FIG. 13 illustrates an exemplary interface that may be used in presenting visualizations that emulate particular switches and allow interfacing with the particular switches, in accordance with embodiments of the present disclosure.

FIG. 13 illustrates an exemplary interface 1100 that may be used in presenting visualizations that emulate particular switches and allow interfacing with the particular switches, in accordance with embodiments of the present disclosure. The visualization 1102 may include a port-by-port layout the same as (or substantially the same as) the switch layout of the particular switch—a visual representation of the switch and its ports—similar to what it would look like if one walked up to it and visually inspected it. The format of the layout visualization 1102 may be specified by the switch modeling engine 906 to correspond to the particular switch based at least in part on the retrieved switch-specific specifications.

Figure 14:
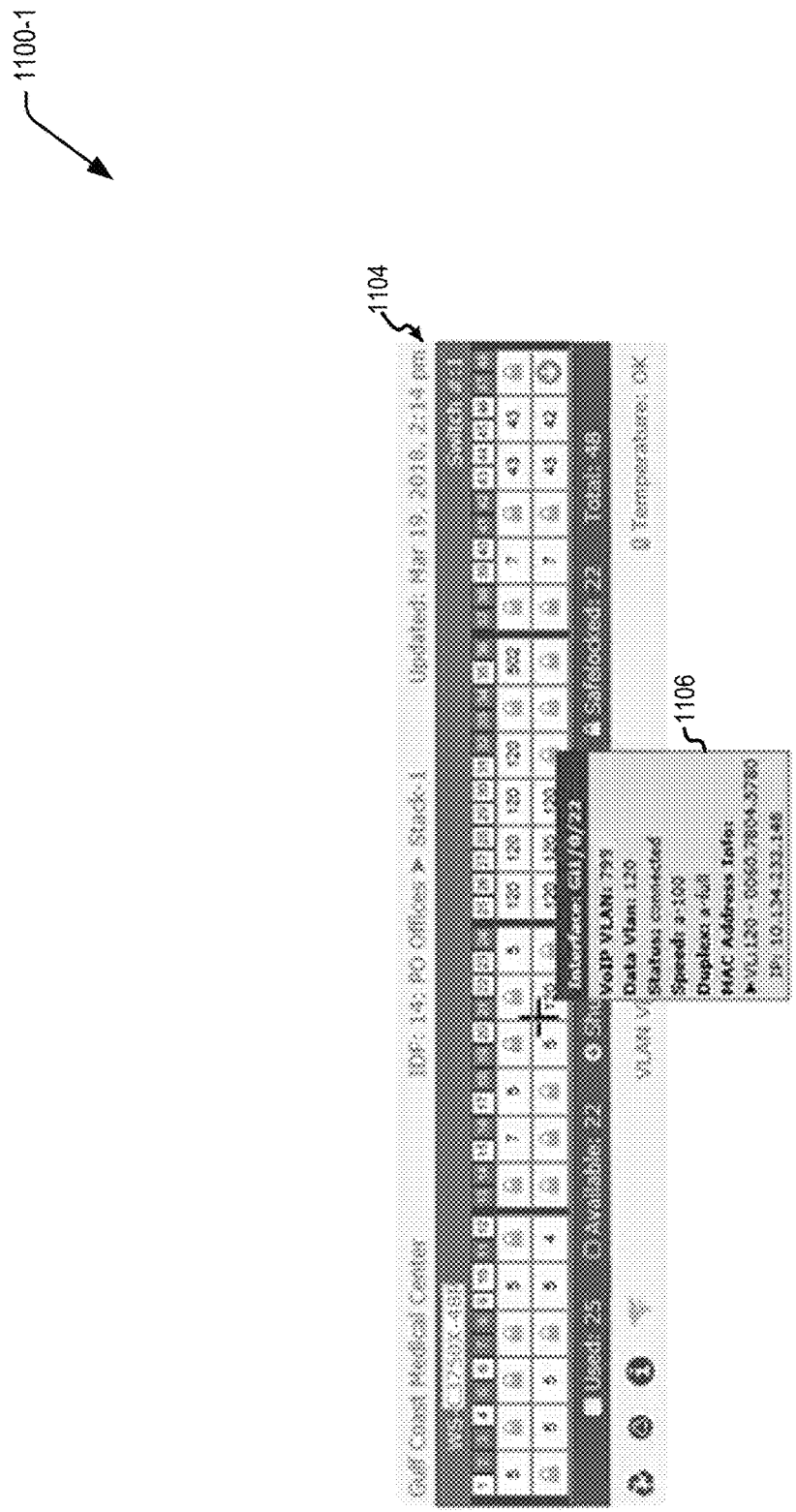
FIG. 14 illustrates an exemplary interface depicting a visualization of only a single switch, in accordance with embodiments of the present disclosure.

As in the example depicted, the visualization 1102 may include multiple switches corresponding to a particular IDF and switch stack in a particular location, each of which may be identified in the visualization 1102 with any suitable identifiers such as those depicted. The visualization 1102 may identify one or a combination of a particular facility, a particular IDF within the facility, a particular switch stack that within the IDF, a location within the particular facility of the IDF/switch stack/switch (e.g., a particular room on the 5th floor of the facility), and/or the like. In some embodiments, the visualization 1102 may be user-selectable to drill down in the view so that only a subset of the switches is depicted, such as a single switch view, and may be further user-selectable to expand the view to include multiple switches and, in some embodiments, multiple switch stacks. FIG. 14, for example, illustrates an exemplary interface 1100-1 depicting a visualization 1104 of only a single switch, in accordance with embodiments of the present disclosure.

Each port of a switch represented with the interface 1100 may be user-selectable to reveal port-specific details, such as indicia of the port configuration and summary data, according to a layered scheme. For example, layered port summary information is revealed with hover-over-to-reveal functions on a port-by-port basis (e.g., revealing port configuration and summary data for particular port in response to a mouse-over event directing cursor or other selection tool of the GUI to hover over the particular graphical representation of the particular port). FIG. 14 depicts one possible example of revealed port configuration and summary data 1106 for port 120 of the particular switch depicted. The revealed data 1106 may include an identification of which VLAN the port is a part of; the type of VLAN; the status of the port as to whether or not it is connected, live, enabled, or disabled; the speed of the connection; a duplex indicator; MAC address information; and/or the like.

Figure 15:
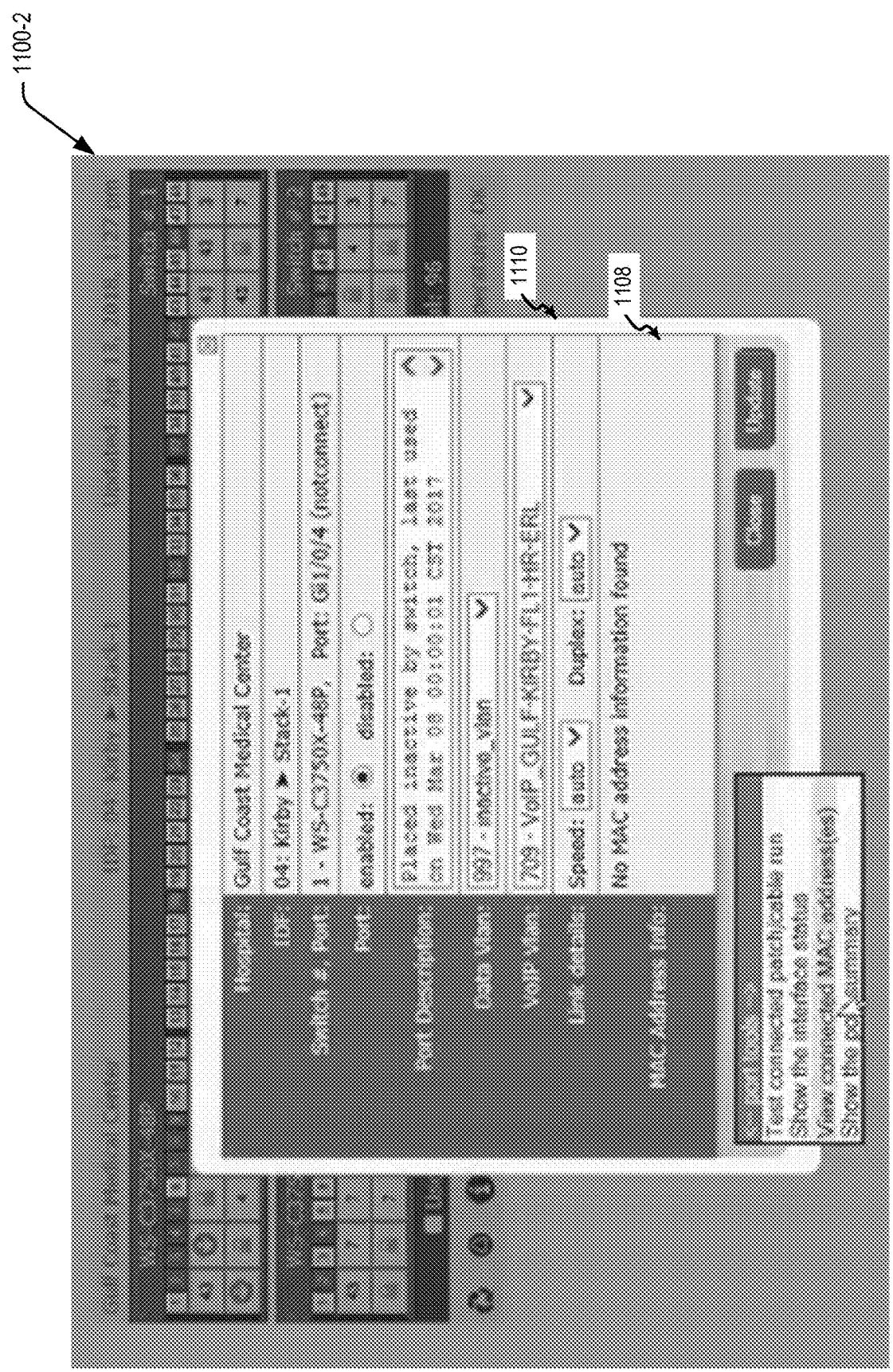
FIG. 15 illustrates another possible example of another layer of revealed port configuration and summary data for another port of another particular switch, in accordance with embodiments of the present disclosure.

FIG. 15 depicts another possible example of another layer of revealed port configuration and summary data 1108 for another port of another particular switch depicted, in accordance with embodiments of the present disclosure. In some embodiments, the example of FIG. 15 may correspond to a modal window or pop-up window 1110 launched in response to user-selection of a particular port, rather than simply hovering over the port. The revealed data 1108 may include one or a combination of a particular facility, a particular IDF within the facility, a particular switch stack that within the IDF, a location within the particular facility of the IDF/switch stack/switch; an identification of which VLAN the port is a part of; the type of VLAN; the status of the port as to whether or not it is connected, live, enabled, or disabled; the speed of the connection; a duplex indicator; MAC address information; and/or the like. The revealed data 1108 may further include a port description and change history. Accordingly, layered information may be accessible on a port-by-port basis according to various types of user selection interaction with the interface 1100.

In various embodiments, the switch stack emulator may provide a non-live view with the interface 1100 that includes a user-selectable refresh option and/or a user-selectable refresh at a particular time option for the corresponding one or more switches currently displayed via the interface 1100. In response to a user selection of the respective user-selectable option, the system 830-2 may gather switch data 827A from the corresponding one or more switches, switch stack, and/or IDF immediately, at a user-indicated time, or at a system-determined time as disclosed herein. Thus, such user selections may correspond to triggering events for gathering switch data 827A updates.

In various embodiments, the subsystem 900 may facilitate a live switch stack emulator. For example, the switch stack emulator may provide a live view, where dynamic updates are generated in the background with the system 830-2 polling the one or more switches, switch stacks, and/or IDFs corresponding to the one or more switches currently displayed via the interface 1100 in real time as disclosed herein. Such real-time polling may be performed independently of which switches are currently being displayed via the interface 1100. Alternatively, such real-time polling may be initiated upon user selection of one or more switches for display via the interface 1100. Thus, the real-time polling may be selective and targeted to one or more particular switches, with the user-initiated access of the one or more particular switches via the interface 1100 being a trigger event for gathering switch data 827A updates.

Disclosed embodiments may further provide for a universal switch stack configurator that allows for the remote management of switches which can include making changes to configurations of switches while enforcing constraints and limitations on the user so as to avoid detrimental changes to critical switch ports and corresponding endpoints. User-initiated changes to configurations of switches may be initiated through the graphical interface of the emulator. Each port may be user-selectable to edit details of the port configuration. Example changes may include configuring a port for a different VLAN that is available in the network. Further, example changes may include configuring a port for a different type of VLAN (e.g., data VLAN versus voice VLAN). This may involve updating electronic ERL (emergency response location) records with a subset of switch data 827A and switch/port identifiers, and transmitting updates and/or updated records to local authorities (e.g., one or more external user devices 818(1), 818(2), and 818(N), which may include one or more servers of the local authorities) via the one or more external networks 820. In addition, the remote management can include testing cables, ports, and/or endpoints.

As one possible example of interface options to make changes to configurations, the window 1110 may include user-selectable options to make changes to the port. For example, the user-selectable options may include one or a combination of options to enable or disable the port, change a data VLAN assignment, change a VOIP VLAN assignment, change link speed and duplex attributes, and/or the like. Such options may thus allow for changing the port configuration so that the port is part of any other VLAN that is available in the network. Still further, a number of port tools may be accessible via user-selectable options. By way of example, the port tools may include options to test the connected patch/cable run, show the interface status, viewed connected MAC address(es), show the port summary, and the like. Accordingly, each port may be user-selectable with the interface 1100 to not only to reveal configuration attributes of the port, but also to change the configuration of the port and reconfigure the port in various ways.

As part of enforcing constraints and limitations with the emulator, disclosed embodiments may employ hierarchically scaled criticality control 1031-6 of switches on a port-by-port basis. The system 830-2, facilitating the emulator, may authenticate the user, e.g., with the authentication access engine 604 and the login engine 606. Which ports are surfaced by the emulator may be determined as a function of the respective criticality attributes of the ports and a function of the user role and/or security attribute mapped thereto. For user roles having the highest security level clearance, all ports of a switch may be exposed via the graphical interface of the emulator. The emulation 1031-5 for such access may include a visual representation of the switch and its ports substantially similar to what it would look like if one walked up to it and visually inspected it. Further, with high security level clearances, change-level access may be permitted for all ports of the switch, or a subset thereof depending on the security level clearances.

For user roles having lower security level clearance, the most critical ports of a switch may be hidden from the user of the graphical interface of the emulator. Which ports are to be hidden may be determined as a function of the respective criticality attributes of the ports and a function of the user role and/or security attribute mapped thereto. For example, the security attribute of a given port may have a value corresponding to a particular category of criticality (e.g., high criticality, low criticality, and/or the like). The manner in which ports are hidden from view may include completely omitting all indications that the port exists from the graphical representation of the switch. With such a representation of the switch, the emulator may, in some embodiments, generate a modified graphical representation of the switch to represent the switch with one or more portions omitted and graphical representation portions of other portions of the switch may be modified to obscure the omitted portions. Additionally or alternatively, the manner in which ports are hidden from view may include indicating the existence of the port along with an indication that the port is locked or that access to the port is otherwise restricted. For example, a restricted port may be graphically indicated is locked, grayed out, blurred, and/or otherwise obscured and may not have a user-selectable option associated therewith such that all access to the restricted port may be prohibited for lower user security levels.

The hierarchically scaled criticality control 1031-6 of switches may include further differentiating at least some of the ports graphically depicted in the emulation 1031-5 as a function of their respective criticality attributes with different safeguards being implemented on a port-by-port basis. For example, ports having criticality attributes that satisfy one or more criticality thresholds may be restricted for particular user security levels so that change-level access is not permitted, while read-level access may be permitted with the user-selectable options of the interface. As another example, change-level access may be restricted for certain ports such that only certain types of changes and/or changes within certain limits may be allowed. For instance, some ports may be restricted to servicing a particular area (say, e.g., loads on the fifth floor of a facility) which may be defined in order to facilitate emergency services identifying pertinent locations based on the ERL (e.g., when 911 is called).

As yet another example, criticality scaled warnings may be presented via the interface (e.g., via modal windows and/or the like) with warnings and user input requirements, complexity of which may be contingent upon the criticality attribute of the port, the type of change the user is attempting make to the port, security level attribute of the user, the timing of the requested change with respect to the criticality attribute of the port (e.g., whether or not the change request is at a peak time for the load(s) served by the port with a threshold-satisfying amount of live traffic), and/or the like. For instance, a lower level scaled warning may correspond to a requirement that the user input simply acknowledge the warning before proceeding. Higher-level scale warnings may include requirements for multiple user inputs of acknowledgments, a user identifier, an authentication codes transmitted by the system 830-2 to an endpoint device and/or account associated with the user, and/or the like, with warnings of greater complexity being implemented as a function of the aforementioned factors.

Additionally, one or more security notifications 1031-7 may be transmitted to an endpoint device (e.g., an administratory device) and/or an administrator account along with one or more of the higher-level scale warnings and/or upon authentication failures when the input for requirements of entry of user identifiers and/or authentication codes are determined by the system 830 to be incorrect. In so doing, the system may cause one or more security notifications 1031-7 (push notifications, automated system voice announcements, pop-ups on an endpoint interface communicatively coupled with the system, emails, automated phone calls, alarms, etc.) to be directed to one or more authenticated endpoints, devices, and/or accounts based at least in part on data retained in an endpoint specification, and the system may require additional authentication, which could be captured consequent to the one or more endpoint notifications. In various embodiments, the one or more security notifications 1031-7 may cause presentation of one or more user-selectable options (e.g., electronic buttons, HTTP link/hyperlinks, URLs, etc.) to prompt a user to invoke, wake up, open, and/or otherwise activate a secure application/interface with which the endpoint device is configured, to login to the emulator. In various embodiments, the one or more security notifications 1031-7 may correspond to an interrupt and/or a command a command that may interrupt one or more current processes on the endpoint device and/or automatically launch, invoke, wake up, open, and/or otherwise activate a program, application, and/or subroutine corresponding to the emulator on the endpoint device to act as a notification and force immediate execution of operations of the endpoint device to facilitate authorization of the port access and/or restrictions on the port access. Such a program, application, and/or subroutine may be provided directly or indirectly by the system for installation and execution by the endpoint device to allow for the notifications and responsive administratory input with one or more user-selectable options and input fields. In one example implementation, one or more modal windows may be generated that prevent further interactions with the second endpoint device without first interacting with the one or more modal windows and accessing the data corresponding to the one or more authentication stages.

The switch modeling engine 906 may include or otherwise correspond to a learning engine that may employ an ongoing learning mode to create, confirm, correct, and/or refine pattern data 808B-2 for particular switches and endpoint devices. The switch modeling engine 906 may be an analysis and matching engine that employs machine learning to process the components input 940 (e.g., switch data 827A, endpoint input 914A, and sensor data 916A) and derive the particularized pattern data 808B-2. The switch modeling engine 906 may be configured to perform any one or combination of features directed to matching or otherwise correlating switch data 827A, endpoint input 914A, and sensor data 916A.

In various embodiments, the components input 940 may include device identification data, such as data to facilitate detection, recognition, and differentiation of any one or combination of types of endpoint devices and components. For instance, the device identification data may include indicia of smart phones, tablets, wearable computing/communication devices, other computing devices, electronic wallets, electronic tokens, authentication codes (e.g., key codes entered with an input device), and/or the like. In various embodiments, the components input 940 may include biometric identification data, such as any data to facilitate one or combination of fingerprint recognition, facial recognition, audio recognition, optical recognition, heat recognition, infrared recognition, and/or the like. In various embodiments, the components input 940 may include action data, such as any data to facilitate detection, recognition, and differentiation of one or combination of types of movements, directions of movements, speeds of movements, device use, voice data, performance recognition, explicit user input, and/or the like. The components input 940 may include location data, such as any data to facilitate detection, recognition, and differentiation of one or combination of locations. For instance, the location data may include data about approved locations of endpoint devices, colocations of endpoint devices, changes in locations of endpoint devices, and/or the like. The components input 940 may include temporal data, such as any data to facilitate detection, recognition, and differentiation of one or combination of temporal factors that may bear on, and enhance, authentication features disclosed herein. For instance, the temporal data may include time of day data, time of week data, time of year data, time on task data, state-based timing data, transition timing data, and/or the like. The components input 940 may include contextual data, such as any data to facilitate detection, recognition, and differentiation of one or combination of contextual factors that may bear on, and enhance, authentication features disclosed herein. For instance, the contextual data may include data about numbers of endpoint devices corresponding to a certain location and/or a certain set of operations, types of endpoint devices, endpoint colocations, ambient or baseline audio data, ambient or baseline video data, and/or the like.

The monitoring engine 904 may gather and process components input 940 to facilitate creation, development, and/or use of switch profiles 808B-1 (specifications), endpoint profile 808B-3 (specifications), and pattern data 808B-2 (specifications), including governing categories and/or rules. The captured data may be aggregated, consolidated, and transformed into the specifications. For example, in some embodiments, the modeling engine 906 may determine switch configuration, operational, load, and environmental characteristics based at least in part on components input 940 received and processed by the monitoring engine 904. The modeling engine 906 may define sensed attributes of switch operations, switch loads, and switch stack room environments based at least in part on the individual characteristics. The modeling engine 906 may generate, develop, and/or otherwise use switch profiles 808B-1, endpoint profile 808B-3, and pattern data 808B-2 based at least in part on components input 940. The monitoring engine 904 may compile any one or combination of such data to create, based at least in part on machine-learning, pattern data that may include pattern particulars to facilitate detection, recognition, and differentiation of switch and endpoint patterns based at least in part on the components input 940.

The monitoring engine 904 and/or the modeling engine 906 may include a reasoning module to make logical inferences from a set of the detected and differentiated data to infer one or more patterns of activity 808B-2 for particular switches and/or for aspects in the proximity of the switches (e.g., the switch stack room). For instance, the pattern data 808B-2 may include information about any one or combination of identification histories, action histories, location histories, temporal histories, and/or the like, any set of which may be used to derive one or more patterns of activity for particular switches and/or for aspects in the proximity of the switches. A pattern-based reasoner could be employed to use various statistical techniques in analyzing the data in order to make inferences based on the analysis of the different types of sensor data and switch data, both current and historical. A transitive reasoner may be employed to infer relationships from a set of relationships related to different types of sensor data and switch data.

The monitoring engine 904 and/or the modeling engine 906 may employ an ongoing learning mode to confirm, correct, and/or refine determinations made for the switch specifications 808B-1 and/or pattern data 808B-2, including activity patterns, categories, and/or rules, for switches and proximate conditions sensed in the areas about the switches (e.g., switch stack room). For example, having come to one or more conclusions about one or more switches and/or conditions sensed in a proximate area, the one or more adaptive processing devices 902-1 (e.g., the control engine 908) may confirm and/or correct the determinations with feedback loop features. Certain embodiments may provide one or more endpoint devices 914 with feedback options to facilitate the ongoing learning mode. User-selectable options (e.g., via the emulator interface or another device interface) provided with notifications (e.g., push notifications to the endpoint device, pop-up/modal windows with the emulator interface, and/or the like) could be provided to allow administrative confirmation or correction of conditions detected. The feedback could be used for training the system to heuristically adapt conclusions, switch specifications, correlations, attributes, triggers, patterns, and/or the like.

Each switch specification 808B-1 and/or set of pattern data 808B-2 linked to a particular switch specification 808B-1 may be unique and may include baseline attributes for activity patterns, categories, and/or rules attributed to a particular switch and proximate conditions sensed in the area about the switch. Subsequently detected data may be used, in conjunction with previously detected data, to adjust a switch specification 808B-1 and/or linked set of pattern data 808B-2. For example, baseline detected biometric data, action data, location data, temporal data, and/or contextual data may be attributed to, and/or used to refine attributes for, the switch and switch stack room with an initialization process, and one or more subsequent detections may be compared to the baseline readings and/or attributes to determine changes between the baselines and the subsequent readings and/or attributes. Such differences may be used to develop the switch specification 808B-1 and/or cross-referenced set of pattern data 808B-2.

Having switch specifications 808B-1 and/or linked sets of pattern data 808B-2 which include distinctive characteristics and attributes of each switch and area proximate thereto, the monitoring engine 904 and/or the modeling engine 906 may individually distinguish each switch, operations and configurations of the switch, activities corresponding to the vicinity, temporal aspects corresponding to the operations and activities, and contexts corresponding to the operations and activities when the monitoring engine 904 receives and processes data corresponding to the switch. The monitoring engine 904 and/or the modeling engine 906 may correlate captured sensor data 916A to previously captured and stored sensor data 916A in order to identify an individual in the vicinity of the switch. In some embodiments, such sensor data 916A may include biometric identification data. The monitoring engine 904 and/or the modeling engine 906 may be configured to match information for an individual captured via the monitoring engine 904 to one or more patterns from a set of patterns. In some embodiments, the monitoring engine 904 and/or the modeling engine 906 may receive sensor data 916A (e.g., video and/or other types of sensor data) corresponding to one or more switch areas (e.g., switch stack rooms), identify attributes of the one or more switch areas based at least in part on the sensor data, and match the identified attributes to one or more patterns from the pattern data 808B-2. Any suitable category may be employed to facilitate adaptive controls 1031 in accordance various embodiments. Certain patterns disclosed herein may correspond to characterizations of individuals sensed in the switch areas. The patterns (e.g., video baseline patterns) may be used by the system 900 to identify inconsistencies/nonconformities of real-time senor detection (e.g., real-time video) with respect to the particularized patterns. When such inconsistencies/nonconformities satisfy one or more thresholds, adaptive controls 1031 may be caused.

The monitoring engine 904 and/or the modeling engine 906 may use facial recognition to match data for an individual sensed in the vicinity of one or more switches to image data retained by the system (e.g., in the endpoint specifications 101B-3) to determine whether a sensed individual is known or a new individual. The visual characteristics of an individual may be identified at least in part by formatting, rescaling, cropping, and/or otherwise preparing images (or portions of the images where the outer shapes are defined as boundaries) for further image processing. Captured individual image data may be correlated to reference images using any suitable facial trait qualifications for correlation. For example, as disclosed in further detail herein, the monitoring engine 904 and/or the modeling engine 906 may include an image analyzer and handling module, and may learn patterns of sensor-based data corresponding to visual characteristics of the sensor-based data gathered regarding the endpoint device such as one or a combination of colors and any visual metric based at least in part on light detection—e.g., aggregate color palette, color palette as a function of time, changes in light, background characteristics, objects recognized, static/moving objects, pixel identification, detecting color component values, detecting color codes, and/or the like. These different visual metric types may be bases for various visual metric categories. Ranges of visual metric values for these different visual metric types may be mapped to visual metric categories. The monitoring engine 904 and/or the modeling engine 906 may link particular individual image data to endpoint specifications 101B-3 with image data associated with individuals, to identify a known individual or a new individual (e.g., based at least in part on satisfying one or more thresholds that may correspond to a tolerance range of the extent of matching characteristics, in some embodiments). In various embodiments, the monitoring engine 904 and/or the modeling engine 906 may match (e.g., based at least in part on satisfying one or more thresholds that may correspond to a tolerance range of the extent of matching characteristics, in some embodiments) any one or combination of types of device identification data, biometric identification data, action data, location data, temporal data, contextual data, and/or pattern data to determine and identify a status of an individual and/or to cause authentication control in view of a particular individual.

The monitoring engine 904 and/or the modeling engine 906 may be configured to match information for input 940 captured via the monitoring engine 904 to one or more categories from a set of categories. Some embodiments may qualify captured data according to a graduated identification scale. Any suitable authentication scale may be used in various embodiments. In some embodiments, an authentication scale could entail a categorization scheme, with categories such as strong authentication of a particular individual, possible authentication of a particular endpoint, weak authentication of a particular individual, and an unknown individual, or any suitable categories such as other categories disclosed herein.

The monitoring engine 904 and/or the modeling engine 906 may perform audio analysis of audio data 916A captured with one or more microphones 916 and/or other audio sensors 916 disposed in, on, and/or about one or more switch stacks and/or switch stack rooms to determine one or more sound baselines for the areas proximate thereto. The monitoring engine 904 and/or the modeling engine 906 may learn patterns of sensor-based data metrics corresponding to audio characteristics disclosed herein, such as tonal, pitch, and volume characteristics; keywords and corresponding language used; cadence, pauses, and accents; ambient noise; and/or the like as distinctive markings. The monitoring engine 904 and/or the modeling engine 906 may include an audio analyzer and handling module to facilitate that detection, which may detect one or more audio characteristics by way of analyzing audio, applying voice recognition, acoustic spectrum analysis, and/or the like. For example, an acoustic analysis may include analyzing and identifying the sample for acoustic characteristics such as frequencies, intensities, tones, pitches, and/or the like audio metrics (such as those disclosed above) over time. The different audio metric types may be bases for various audio metric categories. Ranges of audio metric values for the different audio metric types may be mapped to audio metric categories. The monitoring engine 904 and/or the modeling engine 906 may select values of one or a combination of the acoustic metrics as distinctive markings and may compile the values as an acoustic impression for the purposes of characterizing a sample. The acoustic impression may include a spectrum of frequencies in various embodiments. In some cases, the monitoring engine 904 and/or the modeling engine 906 may correlate the acoustic impression to one or more audio metric categories for the similar acoustic impressions. In various embodiments, the correlation may be based at least in part on matching selected values of the acoustic metrics (e.g., distinctive values such as peaks, baselines, averages, etc.) to acoustic metric ranges of values specified for certain audio metric categories. Thus, the audio impressions may be used by the system 900 to identify inconsistencies/nonconformities of real-time audio detection with respect to particularized patterns. When such inconsistencies/nonconformities satisfy one or more thresholds, adaptive controls 1031 may be caused.

Additionally or alternatively, the monitoring engine 904 and/or the modeling engine 906 may perform infrared analysis of infrared data 916A captured with infrared sensors 916 disposed in, on, and/or about one or more switch stacks and/or switch stack rooms to determine one or more infrared baselines for the areas proximate thereto. Some embodiments may perform infrared analysis of heat data captured with heat sensors 916 to determine one or more heat baselines for the proximate areas. Captured infrared and/or heat data may be correlated to reference infrared and/or heat impressions. As disclosed herein, the monitoring engine 904 and/or the modeling engine 906 may link particular endpoint infrared and/or heat impressions to endpoint specifications 101B-3 with infrared and/or heat impressions associated with individuals, to identify a known individual or a new individual. The reference infrared and/or heat impressions data may be refined over time as infrared and/or heat baseline(s) for a particular individual are developed with additional data captures. Such reference impressions may be used by the system to identify inconsistencies/nonconformities with respect to particularized patterns. When such inconsistencies/nonconformities satisfy one or more thresholds, adaptive controls 1031 may be caused.

Various embodiments may provide for adaptive controls 1031 corresponding to port-level and switch-level control and security operations that are self-correcting based at least in part on recognition of port activity, switch activity, and/or activities in areas proximate to switch stacks (e.g., switch stack rooms). As disclosed herein, the switch monitoring engine 904 may gather switch data 827A from one or more particular switches corresponding to a particular switch stack, and the modeling engine 906 may develop recognized patterns of activity for each switch and each switch port. The recognized patterns of activity may include whether each port is live, the types and amounts of traffic on each port, and/or the like as a function of time. Hence, the port-specific activity patterns may include temporal patterns of activity and each of the recognized patterns may be stored in the respective switch profiles 808B-1. The system 900 may provide for certain adaptive controls 1031 corresponding to smart alert determinations 1031-8 that cover a large range of possible conditions that can arise with the switch monitoring engine 904 monitoring switch data 827A.

For example, when the system 900 detects that a switch is not responding, the system 900 may determine whether the system 900 cannot login to the switch because the device is offline or because the IP address for the switch is incorrect. The system 900 may perform ping to see if the switch is even online and determine if the switch has a host name. In so doing, the system 900 may determine whether an incorrect IP address is mapped to the switch, whether SSH or another system standard is not enabled on the device, or whether the hostname is in the DNS. When a switch does not respond in response to being pinged, diagnostics may be run by the system 900 to vet out what the problem is. The system 900 may perform testing with respect to a series of condition checks to determine a particular condition that may be the cause or the result of a non-working switch, a non-responsive switch, or other switch issues. The system-executed testing can include testing test the connected patch/cable run, testing ports, and/or testing endpoints. When a particular condition is detected, a decisional algorithm may be employed to determine whether the detected condition is one where the system can self-heal. Some conditions can qualify for self-correction 1031-9. By way of example, some detected conditions can include an invalid IP address, an authorization failure, an authentication failure (e.g., a machine has not been put into management), a hostname is not in the DNS, etc.

The system 900 may detect an authentication failure. In the case of an authentication failure condition, the system 900 may attempt to self-correct by determining whether the device has been put into management and, when the system 900 determines that the device has not been put into management, the self-correction processes 1031-9 may initiate moving the device into management with an address management service of the system. This may involve the system 900 may utilize data gathered via the consolidated switch data and/or automated cross-walking of a database to gather information to map to the device, such as: a co-ID of a facility, a type of device or device model, a group ID, a company, a division/market ID, a datacenter ID to which the device connects, etc. Such information could be prepopulated in a division-specific table that can be used to auto-submit those variables for processing by the address management service and converting the device into management. An API can be used to communicate the information, e.g., via JSON file. The information can be used to auto-submit those variables for processing. Further, if the device responded with an indication that the command authorization failed, the system 900 may re-manage device. For example, if a layer 2 access is required to communicate with the device, whereas that device is detected as being managed as a layer 3 device, then the system 900 may re-manage device for layer 2 access.

As another self-healing example, when a port is detected as being in error-disabled mode, a shut/no shut operation may be performed to disable/enable the port to attempt to clear the condition. This process can be launched when pulling switch data 827A. This can solve a problem of interrupted signaling (e.g., that could be caused by a vendor physically disturbing connections) that triggers the error-disabled mode. In the case that a condition does not qualify for self-correction, the system 900 may at least provide meaningful error reports to an administrative endpoint device rather than just indicating a non-working/non-responsive switch when a switch does not work.

As the switch monitoring engine 904 continues to monitor switch data 827A in accordance with embodiments disclosed herein, the switch monitoring engine 904 and/or the switch modeling engine 906 may compare detected switch data 827A to particular values and/or state-based flags and corresponding fields (which may be in the form of tables, for example) of the particularized patterns stored in switch profiles 808B-1 to identify inconsistencies/nonconformities with respect to particularized patterns. When such inconsistencies/nonconformities satisfy one or more thresholds, certain adaptive controls 1031 corresponding to security operations, such as authentication control actions, may be caused. As one example, when a particular port has been recognized as being open but not live for a threshold period of time (e.g., any suitable threshold value of minutes, hours, days, etc.), and the port is subsequently detected as going live without authenticated input being received via the emulator, the site components control engine 908 may initiate security control operations in response. This example case could correspond to, for example, a vendor or other individual entering into a switch stack room, finding an open port, and connecting to it without authorization.

The security control operations may include switch data gathering 1031-2 regarding the change in port status, which may be by way of throttled monitoring 1031-4, which in turn may include activating sensors of one or more different types 1031-11. Such switch data 827A could be included in one or more security notifications 1031-7 that the system may transmit to an endpoint device (e.g., an administrative device) and/or an administrator account along with indications of the state change, the previous port/VLAN state prior to the state change, the detected inconsistencies/nonconformities, and/or the like. Again, the one or more security notifications 1031-7 may include one or a combination of the features of security notifications disclosed above.

Additionally or alternatively, the security control operations may include safe lock 1031-10 features. The system 830 may be configured to enforce safe lock 1031-10 functionalities that include locking down a port when the safe lock 1031-10 process is triggered. The triggering event may correspond to the detection of the inconsistencies/nonconformities that satisfy the one or more thresholds, as in the above example. The lockdown of a port may include designating a port as inactive. For example, designating a port as inactive may include setting the port to an inactive VLAN that is not routable. In so doing, the system 830 does not shut the port down, but effectively locks the port down. Accordingly, the system 830 may remotely monitor individual ports, report on port statuses, and remotely lock down ports under certain conditions. In various embodiments, the safe lock 1031-10 features and/or the security notifications 1031-7 features may be facilitated with a script (e.g., Tcl and/or the like) that may reside on the switch as opposed to the server and that may be configured to be triggered when a particular port state changes (e.g., when the port goes live).

Disclosed embodiments may also initiate safe lock 1031-10 processes in response to a steady-state for a certain period of time. For example, if a port has been open and/or inactive for time threshold (e.g., for X days, weeks, etc.), then port lockdown 1031-10 may be initiated. The time threshold parameter value may be user-selectable and/or system-selectable.

In various embodiments, the port lockdown may be automatically executed by the system 830-2 and/or the switch. Additionally or alternatively, the port lockdown 1031-10 may be executed, confirmed, or lifted (i.e., reverted to being designated as active and open) upon system reception of administrative input responsive to the one or more security notifications 1031-7 with one or more user-selectable options and/or input fields presented with the one or more security notifications 1031-7. Stated otherwise, the port lockdown 1031-10 may be system-selectable and immediately executed automatically at least until responsive administratory input is received, or the port lockdown 1031-10 may be user-selectable and executed only upon user direction corresponding to the responsive administratory input. Some embodiments may initially abstain from automatically executing port lockdown 1031-10, but subsequently automatically execute port lockdown 1031-10 as a function of time when responsive administratory input is not received within a certain time threshold and/or as a function of a criticality attribute(s) of one or more components accessed via the port when responsive administratory input is not yet received any criticality attribute(s) satisfy one or more criticality thresholds.

Furthermore, as disclosed herein, data captured from the sensors 916 may be used to identify inconsistencies/nonconformities with respect to phenomena detected in the vicinity of switches. As disclosed, data from various types of sensors 916 may be used for recognizing image (e.g., facial, activity) baselines, sound (e.g., proximate voices or other sounds, vibrational phenomena) baselines, and/or the like, as well as deviations from the baselines. When such inconsistencies/nonconformities satisfy one or more thresholds, the authentication and security control operations 1031 may be caused. By way of example, the system 830-2 may perform image analysis of image data captured with cameras to determine one or more image baselines for areas proximate to switch stacks. With some embodiments, captured image data may be correlated to reference images using any suitable facial trait qualifications for correlation. As disclosed herein, the monitoring engine 904 and/or the modeling engine 906 may link particular image data to endpoint specifications with image data associated with individuals, to identify a known individual or a new individual. The reference image data may be refined over time as an image baseline(s) for a particular individual is developed with additional data captures. Such reference images may be used by the system to identify inconsistencies/nonconformities with respect to particularized patterns. As disclosed herein, when such inconsistencies/nonconformities satisfy one or more thresholds, multiple adaptive controls 1031 may be system-executed.

Figure 16:
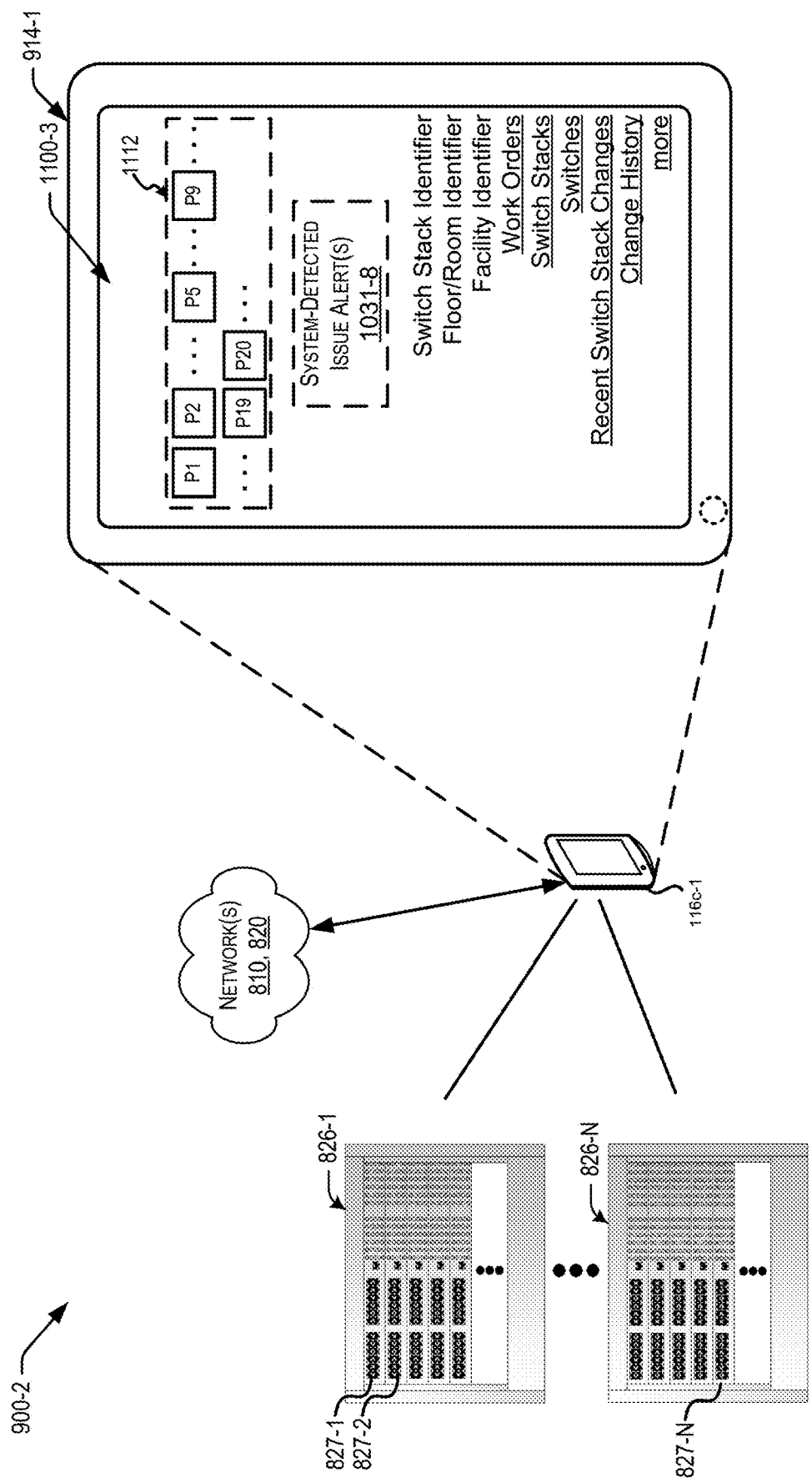
FIG. 16 shows a diagram of aspects of a subsystem to facilitate a universal switch stack emulator and adaptive site component input processing and control via a mobile technician tool and toolbox, in accordance with embodiments of the present disclosure.

FIG. 16 shows a diagram of aspects of a subsystem 900-2 to facilitate a universal switch stack emulator and adaptive site component input processing and control via a mobile technician tool 914-1 and toolbox, in accordance with embodiments of the present disclosure. Various embodiments of the mobile technician tool 914-1 and toolbox may provide various features tailored for mobile access. The diagram illustrates selected portions of the subsystem 900-2 to describe the mobile tool 914-1. The mobile tool 914-1 may be communicatively couplable to the server system 830 via the one or more networks 810 and/or 820. In some embodiments, the mobile tool 914-1 may correspond to one or more of the endpoint devices 914. Accordingly, as disclosed above, the system 830 may provide the applications 716-724 to the mobile tool 914-1, communicate with the mobile tool 914-1 via the applications 716-724, and/or otherwise facilitate a mobile switch stack emulator interface 1100-3 via the endpoint device interfaces 810C to expose features of the emulator to the mobile tool 914-1. In some embodiments, the endpoint device interfaces 810C may include the mobile emulator interface 1100-3.

The mobile tool 914-1 may be configured to provide for location-intelligent adaption of features so that at least some of the features provided to a technician may be at least partially based on the location of the mobile tool 914-1. The mobile tool 914-1 may automatically identify a technician's location and map that location (in addition to the endpoint profile 808B-3 corresponding to the technician and/or the mobile tool 914-1) to one or more particular switch stacks. For example, the location may be determined by way of one or a combination of RFIDs, QR codes scanned, GPS location detection, cellular triangulation, access point proximity/triangulation, and/or the like and determine which switch stack(s) and/or switches to show automatically with a mobile emulator interface 1100-3. In other words, the mobile tool 914-1 may determine that the technician is a particular switch stack room and may identify switch stack and switches in the switch stack room to represent with the mobile emulator interface 1100-3. In cases where there are multiple switch stacks in the room, the mobile tool 914-1 may identify all switch stacks with interface elements that the user may select to drill down into further details and options for one of the switch stacks. Likewise, the mobile tool 914-1 may identify all or a subset of the switches in the determined or selected switch stack, with interface elements that the user may select to drill down into further details and options for one of the switches. In other instances disclosed further herein, the mobile tool 914-1 may initially identify on particular switch and subset of ports based at least in part on intelligence regarding one or a combination of the particular user, authorization, work histories/patterns, work orders, and/or the like—with interface elements that may allow the user to then select different switch stacks, switches, and/or ports.

Figure 17:
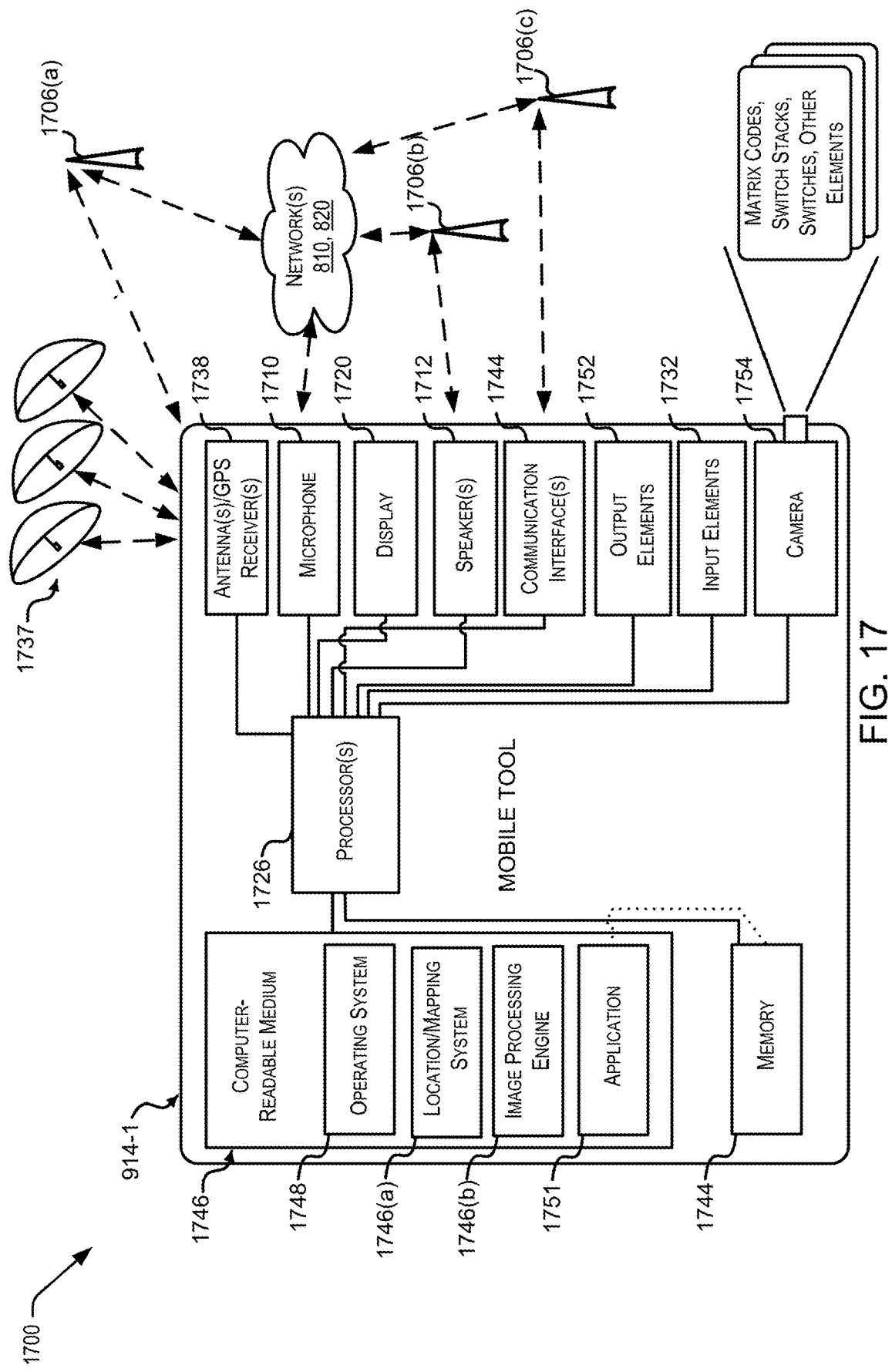
FIG. 17 depicts is a block diagram of a system including one non-limiting example of a mobile tool, in accordance with embodiments of the present disclosure.

Referring now to FIG. 17, depicted is a block diagram of a system 1700 including one non-limiting example of a mobile tool 914-1, in accordance with embodiments of the present disclosure. The mobile tool 914-1 may be a portable device suitable for sending and receiving information over a network in accordance with embodiments described herein. In some embodiments, the mobile tool 914-1 may be provided with an application 1751, which may correspond to a client application configured to run on the mobile tool 914-1 to facilitate various embodiments of this disclosure, such as the mobile emulator interface 1100-3.

In various embodiments, the mobile tool 914-1 configured with the application 1751 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 17, the mobile tool 914-1 includes a display 1720 and input elements 1732 to allow a user to input information into the mobile tool 914-1. By way of example without limitation, the input elements 1732 may include one or more of a keypad, a trackball, a touchscreen, a touchpad, a pointing device, a microphone, a voice recognition device, or any other appropriate mechanism for the user to provide input.

In some embodiments, the system 830 may provide content objects of a suitable type to a user of the mobile tool 914-1 through the application 1751. The application 1751 can include a utility that communicates with the server system 830 to control downloading, displaying, caching, and/or other operations concerning the handling of content objects. In some embodiments, the mobile tool 914-1 may include one or more additional applications to facilitate features provided via the mobile emulator interface 1100-3. For example, the one or more additional applications may be provided by one or more data sources and/or may provide functionality relating to one or more data sources. A data source may be any entity, including, for example, a mapping service, a geolocation service, and/or the like, which may be used by the mobile tool 914-1 to identify its locations and provide the location-dependent features disclosed herein. Content objects (e.g., media objects, multimedia objects, electronic content objects, and/or the like) of any of various types may be displayed through the one or more additional applications. In some embodiments, the one or more additional applications could include the toolkit. In some embodiments, the application 1751 could be grafted into the one or more additional applications to provide tracking and/or content handling functionalities. In some embodiments, the application 1751 could use a number of application programming interface (API) translation profiles configured to allow interface with the one or more additional applications.

The user selection of a user-selectable option corresponding to the application 1751 may involve any one or combination of various user inputs. The user selection may be in the form of a keyboard/keypad input, a touch pad input, a track ball input, a mouse input, a voice command, etc. For example, the content object may be selected by the user by pointing and clicking on a content object. As another example, a content object may be selected by an appropriate tap or movement applied to a touch screen or pad of the mobile tool 914-1.

In some embodiments, the application 1751 can run continuously (e.g., in the background to monitor and report user locations to the server system 830) or at other times, such as when the application 1751 is launched by an end user. The application 1751 may be provided in any suitable way. For non-limiting example, the application 1751 may be made available from the server system 830, a website, an application store, etc. for download to the mobile tool 914-1; alternatively, it may be pre-installed on the mobile tool 914-1. In some embodiments, an application 1751 can be downloaded and installed by an end user on their tool 914-1.

The mobile tool 914-1 includes a memory 1734 communicatively coupled to a processor 1736 (e.g., a microprocessor) for processing the functions of the mobile tool 914-1. The mobile tool 914-1 may include at least one antenna 1738 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The mobile tool 914-1 may also include a microphone 1740 to allow a user to transmit voice communication through the mobile tool 914-1, and a speaker 1742 to allow the user to hear voice communication. The antenna 1738 may include a cellular antenna (e.g., for sending and receiving cellular voice and data communication, such as through a network such as a 3G, 4G, or 5G network). In addition, the mobile tool 914-1 may include one or more interfaces in addition to the antenna 1738, e.g., a wireless interface coupled to an antenna. The communications interfaces 1744 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the mobile tool 914-1 may be capable of transmitting and receiving information wirelessly through both short range, radio frequency (RF) and cellular and Wi-Fi connections.

Additionally, the mobile tool 914-1 can be capable of communicating with a Global Positioning System (GPS) 1737 in order to determine to location of the mobile tool 914-1. The antenna 1738 may be a GPS receiver or otherwise include a GPS receiver. In various embodiments contemplated herein, communication with the mobile tool 914-1 may be conducted with a single antenna configured for multiple purposes (e.g., cellular, transactions, GPS, etc.), or with further interfaces (e.g., three, four, or more separate interfaces). The application 1751 and the mobile tool 914-1 may cooperate with the server system 830 to facilitate tracking of locations of the mobile tool 914-1. For example, the mobile tool 914-1 may transmit location data to any suitable backend system component. The location data may be a combination of data based on one or a combination of GPS, Wi-Fi, cellular, tool sensor(s) such as a barometric sensor or accelerometer, RFID device signals, and/or other techniques for determining a current location of the mobile tool 914-1.

The mobile tool 914-1 can also include at least one computer-readable medium 1746 coupled to the processor 1736, which stores application programs and other computer code instructions for operating the device, such as an operating system (OS) 1748. In some embodiments, the application 1751 may be stored in the memory 1734 and/or computer-readable media 1746. In some embodiments, tool 914-1 may have cryptographic capabilities to send encrypted communications and/or messages protected with message hash codes or authentication codes. Again, the example of tool 914-1 is non-limiting.

The mobile tool 914-1 may access the one or more networks 810 and/or 820 through a wireless link to an access point. For example, a tool 914-1 may access the one or more networks 810 and/or 820 through one or more of access point 1706(a), access point 1706(b), access point 1706(c), and/or any other suitable access point(s). The access points 1706 may be of any suitable type or types. For example, an access point 1706 may be a cellular base station, an access point for wireless local area network (e.g., a Wi-Fi access point), an access point for wireless personal area network (e.g., a Bluetooth access point), etc. The access point 1706 may connect the mobile tool 914-1 to the one or more networks 810 and/or 820, which may include the Internet, an intranet, a local area network, a public switched telephone network (PSTN), private communication networks, etc. In some embodiments, access point(s) 1706 may be used in obtaining location information for the mobile tool 914-1.

The computer-readable medium 1746 can include a mapping application in some embodiments. In certain embodiments, the mapping application 1746(a) can automatically run each time that a user accesses the application 1751. The computer-readable medium 1746 can also include an image-processing engine 1746(b). The image-processing engine 1746(b) can process an image and, in some embodiments, compress the image in a format readable by the server system 830. With some embodiments, the image-processing engine 1746(b) is separate from the application 1751. In other embodiments, the application 1751 may include the image-processing engine 1746(b). The image-processing engine 1746(b) may be configured to recognize and read matrix codes, QR codes, barcodes, and/or the like which may, for example, be affixed, presented, displayed, or otherwise coupled to IDFs, MDFs, switch stacks, switch stack rooms, switches and/or the like to facilitate identification of such devices or areas.

The mobile tool 914-1 can additionally include an integrated camera 1754, capable of capturing images and/or video, and output elements 1752. In certain embodiments, the mobile tool 914-1 may include a non-transitory computer-readable storage medium, e.g., memory 1734, for storing images captured with the camera 1754. With the camera 1754, an end user may capture images of particular matrix codes, QR codes, barcodes, IDFs, MDFs, switch stacks, switch stack rooms, and/or switches to facilitate image analysis. The mobile tool 914-1 may be configured to then recognize certain images with the image-processing engine 1746(b). For example, the mobile tool 914-1 may recognize matrix codes, QR codes, barcodes, etc. which identify IDFs, MDFs, switch stacks, switch stack rooms, switches, and/or the like. Additionally, the mobile tool 914-1 may recognize IDFs, MDFs, switch stacks, switch stack rooms, switches, and/or the like from the images. Additionally or alternatively, the server system 830 may recognize IDFs, MDFs, switch stacks, switch stack rooms, switches, and/or the like elements from the images after the mobile tool 914-1 transmits the images to the server system 830.

In various embodiments, the image-processing engine 1746(b), the monitoring engine 904, and/or the modeling engine 906 may match the captured image data to reference image data retained by the mobile tool 914-1 and/or the system (e.g., in the switch profile data 101B-1) to identify IDFs, MDFs, switch stacks, switch stack rooms, switches, and/or the like. In various embodiments, the image-processing engine 1746(b), the monitoring engine 904, and/or the modeling engine 906 may match (e.g., based at least in part on satisfying one or more thresholds that may correspond to a tolerance range of the extent of matching characteristics, in some embodiments) any one or combination of types of device identification data, location data, and/or contextual data pattern data to identify a particular element. The visual characteristics of such elements may be identified at least in part by formatting, rescaling, cropping, and/or otherwise preparing images (or portions of the images where the outer shapes are defined as boundaries) for further image processing. Captured individual image data may be correlated to reference images using any suitable trait qualifications for correlation, such as one or a combination of colors and any visual metric based at least in part on light detection—e.g., aggregate color palette, color palette as a function of time, changes in light, background characteristics, badge recognition, nameplate recognition, object recognition, pixel identification, detecting color component values, detecting color codes, and/or the like. These different visual metric types may be bases for various visual metric categories. Ranges of visual metric values for these different visual metric types may be mapped to visual metric categories. The image-processing engine 1746(b), the monitoring engine 904, and/or the modeling engine 906 may link particular individual image data to endpoint specifications 101B-3 with image data associated with individuals, to identify a known element (e.g., based at least in part on satisfying one or more thresholds that may correspond to a tolerance range of the extent of matching characteristics, in some embodiments).

In various embodiments, the mobile tool 914-1 may include one or more devices variously referenced as a mobile phone, a cellular telephone, a smartphone (for example without limitation, a smartphone such as: the iPhone® phone; Android™ operating system-based phones; and/or the like), a handheld mobile device, a tablet computer, a web pad, a personal digital assistant (PDA), a notebook computer, a handheld computer, a laptop computer, smart glasses, other wearable computing devices, and/or the like. In embodiments, the application 1751 may be a mobile application. In various embodiments, the application 1751 can be a suitable computer program that can be installed and run on the mobile tool 914-1, and, in some embodiments, the application 1751 may not be a mobile app but may be another type of application, set of applications, and/or other executable code configured to facilitate embodiments disclosed herein. In various embodiments, the application 1751 may correspond to any one or combination of applications disclosed herein.

Referring again to FIG. 16, the mobile tool 914-1 may provide authenticated users with adapted versions of switch stack emulations. For example, the mobile interface 1100-3 may present visualizations that emulate particular switches and allow interfacing with the particular switches in manners that are tailored for mobile access. In so doing, the mobile tool 914-1 and/or the system 830 may intelligently adapt visualizations 1102 and/or 1104 to create corresponding mobile view customized visualizations 1112. The mobile view visualizations 1112 may be customizations and simplifications of the full desktop emulations, switch stack views, switch views, and port views, while allowing for making changes to ports of switch stacks by authenticated users.

Instead of including a port-by-port layout the same as the switch layout of the particular switch, mobile view visualizations 1112 may only include a subset of selected ports. Based at least in part on the retrieved switch-specific specifications, the subset of ports may be selected to include only those ports most relevant to the authenticated user. As in the example depicted, a visualization 1112 may depict a portion of a single switch, with only a subset of the ports of the switch. The visualization 1112 may be user-selectable to expand the view to include multiple switches and, in some embodiments, multiple switch stacks. Switch stacks, locations of a switch stack, switches, and ports may be identified in the mobile interface 1100-3 with any suitable identifiers. The visualization 1100-3 may identify one or a combination of a particular facility, a particular IDF within the facility, a particular switch stack that within the IDF, a location within the particular facility of the IDF/switch stack/switch (e.g., a particular room on the 5th floor of the facility), and/or the like.

In some embodiments, the visualization 1112 may be user-selectable with interface options to expand the view so that a different subset of the ports is depicted. As disclosed above, each represented port may be user-selectable to reveal port-specific details, such as indicia of the port configuration and summary data, according to a layered scheme. The mobile tool 914-1 and emulator interface 1100-3 may be configured to provide one or a combination of the other features disclosed above with respect to the interface 1100, such as switch configuration options, criticality control 1031-6, and/or the like.

The subset of ports in the tailored visualization 1112 may be based at least in part on intelligence regarding one or a combination of the particular user, authorization, work histories/patterns, work orders, and/or the like. The subset of ports selected to be included in the visualization 1112 may be only those ports most relevant to the authenticated user. The subset of ports may be determined as a function of the respective criticality attributes of the ports and a function of the user role and/or security attribute mapped thereto. For example, certain ports that are locked down, requiring high-level authentication to view/edit (e.g., trunks and routed ports requiring role-based access), may not be shown dependent on the user's access level. For user with roles having limited security level clearance, only ports having criticality attributes mapped to the security level of the user role, such that the user may have access to the ports, may be selected for the subset. All others may be omitted from the subset, with the omitted ports being identified as a function of the respective criticality attributes of the ports and a function of the user role and/or security attribute mapped thereto. For the mobile visualization 1112, all indications that the omitted port exists may be completely omitted from the visualization 1112.

In some embodiments, only those ports for which the user has change-level access may be selected for the subset. In some embodiments, ports for which the user has only read-level access may be selected for the subset, as well. In other embodiments, change-level access ports may be selected, with read-level access ports being omitted from the initial visualization 1112, but being revealed upon user selection of an interface element to expand the visualization 1112 to include read-level access ports. In some embodiments, ports for which the user has change-level access may be selected for the subset, with read-level access ports being selected as a function of space limit on the visualization 1112 presented with the mobile tool 914-1. The space limit may depend upon user interaction to adjust presentation parameters (e.g., size, orientation, full screen, partial screen, etc.) of windows and/or frames of the visualization 1112. The space limit may be defined at least in part with a matrix definition, a number of rows, a number of columns, a number of ports in each, window size, frame size, port interface element size, and/or the like.

Additionally or alternatively, the subset of ports in the tailored visualization 1112 may be based at least in part on the endpoint profile 808B-3 for the particular authenticated user. The pattern data 808B-2, including activity patterns, categories, biometric data, action data, location data, temporal data, and/or contextual data, attributed to the user may be used to identify the most relevant subset of ports for the user. For example, ports that the user has previously accessed may be given weighted preference for selection, with previous change accesses given greater weight than previous read accesses. The change history of the ports mapped to the user may thus be used to identify the most relevant subset of ports. Further, work orders received by the system 830 via components input 940 may specify tasks, switch stacks, switches, and/or ports, and may be accorded the highest weight for inclusion in the subset. Hence, if a current work order is pending for the authenticated user, the system 830 may map the work order to one or more particular switch stacks, switches, and/or ports and identify ports of relevance for the user.

Advantageously, the mobile tool 914-1 may be configured to provide issue-intelligent adaption. In accordance with the above disclosure, the mobile tool 914-1 and/or the system 830 may automatically identify issues with the switch stacks (e.g., conditions that can arise with a non-working switch, a non-responsive switch, abnormal switch operations, or other switch issues). The smart alert 1031-8 determinations that cover a large range of possible conditions that can arise with the switch monitoring engine 904 monitoring switch data 827A may be used to trigger alerts 1031-8 regarding the conditions that may be auto-loaded on the mobile interface 1100-3. As disclosed above, some system-detected conditions can qualify for self-correction 1031-9. Those conditions, though self-corrected by the system, may still be graphically emphasized via the mobile tool 914-1 with one or more alerts 1031-8 for follow-up check, verification, and awareness by the technician. Other conditions, for example, those not self-corrected, may likewise be graphically emphasized via the mobile tool 914-1 with one or more alerts 1031-8 for follow-up actions, resolution, and awareness by the technician.

For example, in the case of a port flapping (e.g., going up and down for last 4 months), the interface can graphically emphasize the issue for the technician. Thus, the auto-emphasizing of issues can extend to ports. Further, the tool can auto-launch history of switch stack. This can involve, for example, showing the last 5 changes made to switch stack, while providing user-selectable options for the technician to expand on that if desired. The system can track particular technicians, work histories, what he was working and the changes made, and such tracked information can be integrated with the tool in order to facilitate issue detection and emphasis for subsequent users.

The mobile interface 1100-3 may be adaptive in view of the smart alert 1031-8 to facilitate differentiation of the importance of the smart alert 1031-8. This may include graphical differentiation in presenting the smart alerts 1031-8 to the user in various ways. The mobile interface 1100-3 could visually change presentations of particular smart alerts 1031-8, for example, so that relatively heavily weighted smart alerts 1031-8 are visually flagged for the particular user's attention to add emphasis by way of content positioning in the presentation page of the mobile interface 1100-3 (e.g., moving the smart alert 1031-8 to the top or center of the presented page and adapting to maintain such positioning despite user scrolling), modal windows corresponding to the smart alert 1031-8, graphical characteristics (e.g., different colors, highlighting, flashing, and/or the like) that distinguish the smart alert 1031-8 from other elements of the mobile interface 1100-3. Such presentations of smart alerts 1031-8 may be maintained until the user overrides them or indicates resolution or escalation to other users (e.g., forwarding notification regarding the alert to another user, such as an administrator) via user selection of interface elements. The weights of the conditions and corresponding smart alerts 1031-8 may be determined by the mobile tool 914-1 and/or the system 830 as a function of a criticality score assigned to the conditions and comparison to one or more thresholds corresponding to one or more categories of criticality (e.g., low criticality, medium criticality, high criticality, and/or the like).

Further, the determination of whether to present a particular smart alert 1031-8 may be a function of the particular user and the role of the user. In the case where the particular user is authenticated to have access to a port that is affected by the condition, the smart alert 1031-8 may be presented to the user via the mobile tool 914-1. However, where the particular user is not authenticated to have access to a port that is affected by the condition, the smart alert 1031-8 may be omitted along with any indication of the port in the mobile interface 1100-3. Notwithstanding a lack of authenticated access, some smart alerts 1031-8 may still be presented when the condition is determined to be of sufficient criticality to affect the ports to which the user does have access (e.g., in the case where a condition affects the entire switch).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations may be performed in parallel or concurrently. In addition, the order of the operations may be re-arranged. A process is terminated when its operations are completed, but may have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" may include, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system comprising:
   one or more network interfaces;
   memory configured to store computer-executable instructions; and
   one or more processing devices communicatively coupled with the one or more network interfaces and the memory, the one or more processing devices configured to execute the computer-executable instructions to perform operations comprising:

communicating with a switch via a network, the switch comprising a plurality of ports, where one or more ports of the plurality of ports are communicatively coupled to one or more endpoint devices and/or one or more access points;

causing transmission of data to an endpoint device to facilitate an interface, where the interface:

corresponds to a graphical representation of a set of one or more ports of the switch and is configured to hide at least one port of the plurality of ports of the switch from view in the graphical representation based at least in part on at least one criticality attribute of the at least one port;

is made accessible by the endpoint device; and allows access to switch data via one or more interface elements that are user-selectable;

where the switch data is mapped to the switch, and one or more portions of the switch data are mapped to one or more ports of the set of one or more ports;

processing a transmission received from the endpoint device that corresponds to a selection of a particular interface element of the interface, where the selection indicates a user-initiated change to a port configuration of a particular port of the set of one or more ports; and based at least in part on the selection, evaluating the user-initiated change based at least in part on one or more constraints determined for the particular port of the set of one or more ports.

2. The system as recited in claim 1, the operations further comprising:

changing a port configuration of the particular port of the set of one or more ports when the user-initiated change is determined to meet the one or more constraints.

3. The system as recited in claim 2, the operations further comprising:

causing transmission of updated data to the endpoint device to cause updating of the interface to indicate the changed port configuration.

4. The system as recited in claim 1, the operations further comprising:

prohibiting the user-initiated change when the user-initiated change is determined to violate at least one constraint of the one or more constraints.

5. The system as recited in claim 1, where the interface is configured to allow changes to one or more port configurations of one or more ports of the set of one or more ports via the one or more interface elements.

6. The system as recited in claim 1, where the graphical representation facilitated by interface corresponds to at least a partial port-by-port layout of the switch that visually represents at least part of a physical layout of ports of the switch.

7. One or more non-transitory, machine-readable media storing machine-executable instructions that, when executed by one or more processing devices, cause the one or more processing devices to perform operations comprising:

communicating with a switch via a network, the switch comprising a plurality of ports, where one or more ports of the plurality of ports are communicatively coupled to one or more endpoint devices and/or one or more access points;

causing transmission of data to an endpoint device to facilitate an interface, where the interface:

corresponds to a graphical representation of a set of one or more ports of the switch and is configured to hide at least one port of the plurality of ports of the switch from view in the graphical representation based at least in part on at least one criticality attribute of the at least one port;

is made accessible by the endpoint device; and allows access to switch data via one or more interface elements that are user-selectable;

where the switch data is mapped to the switch, and one or more portions of the switch data are mapped to one or more ports of the set of one or more ports;

processing a transmission received from the endpoint device that corresponds to a selection of a particular interface element of the interface, where the selection indicates a user-initiated change to a port configuration of a particular port of the set of one or more ports; and based at least in part on the selection, evaluating the user-initiated change based at least in part on one or more constraints determined for the particular port of the set of one or more ports.

8. The one or more non-transitory, machine-readable media as recited in claim 7, the operations further comprising:

changing a port configuration of the particular port of the set of one or more ports when the user-initiated change is determined to meet the one or more constraints.

9. The one or more non-transitory, machine-readable media as recited in claim 8, the operations further comprising:

causing transmission of updated data to the endpoint device to cause updating of the interface to indicate the changed port configuration.

10. The one or more non-transitory, machine-readable media as recited in claim 7, the operations further comprising:

prohibiting the user-initiated change when the user-initiated change is determined to violate at least one constraint of the one or more constraints.

11. The one or more non-transitory, machine-readable media as recited in claim 7, where the interface is configured to allow changes to one or more port configurations of one or more ports of the set of one or more ports via the one or more interface elements.

12. The one or more non-transitory, machine-readable media as recited in claim 7, where the graphical representation facilitated by interface corresponds to at least a partial port-by-port layout of the switch that visually represents at least part of a physical layout of ports of the switch.

13. A method comprising:

communicating with a switch via a network, the switch comprising a plurality of ports, where one or more ports of the plurality of ports are communicatively coupled to one or more endpoint devices and/or one or more access points;

causing transmission of data to an endpoint device to facilitate an interface, where the interface:

corresponds to a graphical representation of a set of one or more ports of the switch and is configured to hide at least one port of the plurality of ports of the switch from view in the graphical representation based at least in part on at least one criticality attribute of the at least one port;

is made accessible by the endpoint device; and allows access to switch data via one or more interface elements that are user-selectable;

where the switch data is mapped to the switch, and one or more portions of the switch data are mapped to one or more ports of the set of one or more ports;

processing a transmission received from the endpoint device that corresponds to a selection of a particular interface element of the interface, where the selection indicates a user-initiated change to a port configuration of a particular port of the set of one or more ports; and based at least in part on the selection, evaluating the user-initiated change based at least in part on one or more constraints determined for the particular port of the set of one or more ports.

14. The method as recited in claim 13, further comprising:
changing a port configuration of the particular port of the set of one or more ports when the user-initiated change is determined to meet the one or more constraints.

15. The method as recited in claim 14, further comprising:
causing transmission of updated data to the endpoint device to cause updating of the interface to indicate the changed port configuration.

16. The method as recited in claim 13, further comprising:
prohibiting the user-initiated change when the user-initiated change is determined to violate at least one constraint of the one or more constraints.

17. The method as recited in claim 13, where the interface is configured to allow changes to one or more port configurations of one or more ports of the set of one or more ports via the one or more interface elements.

18. The method as recited in claim 13, where the graphical representation facilitated by interface corresponds to at least a partial port-by-port layout of the switch that visually represents at least part of a physical layout of ports of the switch.

* * * * *